(12) United States Patent
Li et al.

(10) Patent No.: US 10,742,972 B1
(45) Date of Patent: Aug. 11, 2020

(54) MERGE LIST CONSTRUCTION IN TRIANGULAR PREDICTION

(71) Applicant: Tencent America LLC, Palo Alto, CA (US)

(72) Inventors: Xiang Li, Los Gatos, CA (US); Guichun Li, Milpitas, CA (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/528,019

(22) Filed: Jul. 31, 2019

Related U.S. Application Data

(60) Provisional application No. 62/816,058, filed on Mar. 8, 2019.

(51) Int. Cl.
*H04N 19/105* (2014.01)
*H04N 19/176* (2014.01)
*H04N 19/70* (2014.01)

(52) U.S. Cl.
CPC ......... *H04N 19/105* (2014.11); *H04N 19/176* (2014.11); *H04N 19/70* (2014.11)

(58) Field of Classification Search
CPC ..... H04N 19/105; H04N 19/176; H04N 19/70
See application file for complete search history.

(56) References Cited

U.S. PATENT DOCUMENTS

| 10,397,603 | B1* | 8/2019 | Li | H04N 19/52 |
|---|---|---|---|---|
| 2009/0196342 | A1* | 8/2009 | Divorra Escoda | H04N 19/50 375/240.02 |
| 2010/0195715 | A1* | 8/2010 | Liu | H04N 19/176 375/240.02 |
| 2010/0208827 | A1* | 8/2010 | Divorra Escoda | H04N 19/61 375/240.24 |
| 2012/0300850 | A1* | 11/2012 | Yie | H04N 19/105 375/240.16 |
| 2013/0107959 | A1* | 5/2013 | Park | H04N 19/96 375/240.15 |
| 2013/0129237 | A1* | 5/2013 | Yie | G06T 9/004 382/233 |
| 2014/0079132 | A1* | 3/2014 | Amon | H04N 19/176 375/240.16 |
| 2014/0286395 | A1* | 9/2014 | Lee | H04N 19/139 375/240.02 |

(Continued)

*Primary Examiner* — Jeremiah C Hallenbeck-Huber
(74) *Attorney, Agent, or Firm* — Oblon, McClelland, Maier & Neustadt, L.L.P.

(57) ABSTRACT

A method of video decoding in a decoder is described. A first syntax element in a coded video bit stream is received. The first syntax element indicates a maximum allowed number of merge candidates in a set of coding blocks. A maximum allowed number of triangular prediction mode (TPM) candidates for the set of coding blocks is set based on a second syntax element when the second syntax element is received, otherwise it is set based on the first syntax element. When a current coding block in the set of coding blocks is coded in a triangular prediction mode, a triangular prediction candidate list of the current coding block is constructed based on a number of TPM candidates. The number of TPM candidates on the triangular prediction candidate list is equal to the maximum allowed number of TPM candidates.

20 Claims, 17 Drawing Sheets

(56) References Cited

U.S. PATENT DOCUMENTS

| | | | |
|---|---|---|---|
| 2015/0078450 A1* | 3/2015 | Chen | H04N 19/52 |
| | | | 375/240.16 |
| 2018/0041768 A1* | 2/2018 | Koo | H04N 19/96 |
| 2019/0149821 A1* | 5/2019 | Moon | H04N 19/119 |
| 2019/0273921 A1* | 9/2019 | Abe | H04N 19/107 |
| 2019/0281285 A1* | 9/2019 | Piao | H04N 19/88 |
| 2019/0379914 A1* | 12/2019 | Misra | H04N 19/119 |

* cited by examiner

| Triangle partition index | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Split direction | 0 | 1 | 1 | 0 | 0 | 1 | 1 | 1 | 0 | 0 | 0 | 0 | 1 | 0 | 0 | 0 | 0 | 1 | 1 | 1 |
| Merge index of first triangular prediction unit | 1 | 0 | 0 | 0 | 2 | 0 | 0 | 1 | 3 | 4 | 0 | 1 | 1 | 0 | 0 | 1 | 1 | 1 | 1 | 2 |
| Merge index of second triangular prediction unit | 0 | 1 | 2 | 1 | 0 | 3 | 4 | 0 | 0 | 0 | 2 | 2 | 2 | 4 | 3 | 4 | 4 | 4 | 3 | 1 |
| Triangle partition index | 20 | 21 | 22 | 23 | 24 | 25 | 26 | 27 | 28 | 29 | 30 | 31 | 32 | 33 | 34 | 35 | 36 | 37 | 38 | 39 |
| Split direction | 1 | 0 | 1 | 1 | 1 | 1 | 1 | 1 | 1 | 1 | 0 | 0 | 1 | 0 | 1 | 0 | 0 | 1 | 0 | 0 |
| Merge index of first triangular prediction unit | 2 | 2 | 4 | 3 | 3 | 3 | 4 | 3 | 2 | 4 | 4 | 2 | 4 | 3 | 4 | 3 | 2 | 2 | 4 | 3 |
| Merge index of second triangular prediction unit | 0 | 1 | 3 | 2 | 2 | 4 | 0 | 1 | 3 | 1 | 1 | 3 | 2 | 2 | 3 | 1 | 4 | 4 | 2 | 4 |

FIG. 15

MERGE LIST CONSTRUCTION IN TRIANGULAR PREDICTION

INCORPORATION BY REFERENCE

This present disclosure claims the benefit of priority to U.S. Provisional Application No. 62/816,058, "Merge List Construction in Triangular Prediction," filed on Mar. 8, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide method and apparatus for video encoding/decoding. In some examples, an apparatus includes processing circuitry for video decoding.

According to an embodiment of the present disclosure, a method for video decoding in a decoder is provided. In the method, a first syntax element in a coded video bit stream is received. The first syntax element indicates a maximum allowed number of merge candidates in a set of coding blocks in the coded video bit stream. A maximum allowed number of triangular prediction mode (TPM) candidates for the set of coding blocks is set based on a second syntax element when the second syntax element is received. Otherwise, the maximum allowed number of TPM candidates is set based on the first syntax element. When a current coding block in the set of coding blocks is coded in a triangular prediction mode, a triangular prediction candidate list of the current coding block is constructed based on a number of TPM candidates. The number of TPM candidates on the triangular prediction candidate list is less than or equal to the maximum allowed number of TPM candidates.

According to an embodiment of the present disclosure, an apparatus for video coding is provided. The apparatus includes processing circuitry. The processing circuitry is configured to receive a first syntax element in a coded video bit stream. The first syntax element indicates a maximum allowed number of merge candidates in a set of coding blocks in the coded video bit stream. The processing circuitry is further configured to set a maximum allowed number of triangular prediction mode (TPM) candidates for the set of coding blocks based on a second syntax element when the second syntax element is received. Otherwise, the processing circuitry is configured to set the maximum allowed number of TPM candidates based on the first syntax element. When a current coding block in the set of coding blocks is coded in a triangular prediction mode, the processing circuitry is configured to construct a triangular prediction candidate list of the current coding block based on a number of TPM candidates. The number of TPM candidates on the triangular prediction candidate list is less than or equal to the maximum allowed number of TPM candidates.

Aspects of the disclosure also provide a non-transitory computer-readable medium storing instructions which when executed by a computer for video decoding cause the computer to perform a method for video decoding. In the method, a first syntax element in a coded video bit stream is received. The first syntax element indicates a maximum allowed number of merge candidates in a set of coding blocks in the coded video bit stream. A maximum allowed number of triangular prediction mode (TPM) candidates for the set of coding blocks is set based on a second syntax element when the second syntax element is received. Otherwise, the maximum allowed number of TPM candidates is set based on the first syntax element. When a current coding block in the set of coding blocks is coded in a triangular prediction mode, a triangular prediction candidate list of the current coding block is constructed based on a number of TPM candidates. The number of TPM candidates on the triangular prediction candidate list is less than or equal to the maximum allowed number of TPM candidates.

BRIEF DESCRIPTION OF THE DRAWINGS

Further features, the nature, and various advantages of the disclosed subject matter will be more apparent from the following detailed description and the accompanying drawings in which:

FIG. 15 shows an example of a lookup table used to derive a split direction and partition motion information based on a triangle partition index in accordance with an embodiment.

DETAILED DESCRIPTION OF EMBODIMENTS

1. Video Coding Encoder and Decoder

Figure 1:
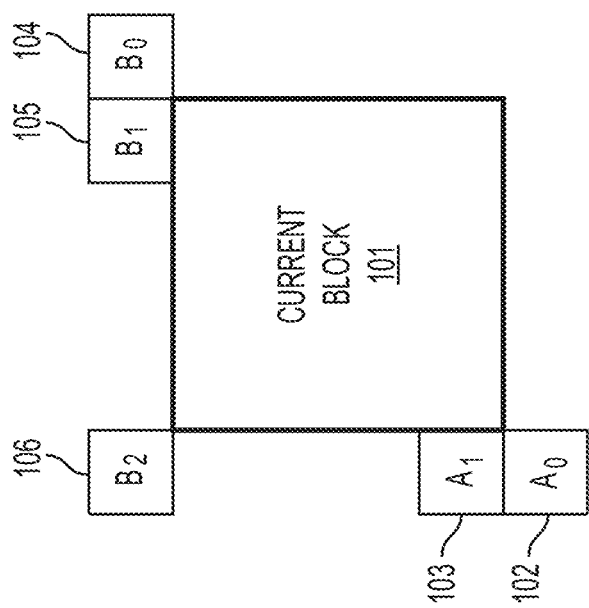
FIG. 1 is a schematic illustration of a current block and its surrounding spatial merge candidates in accordance with H.265.
Figure 2:
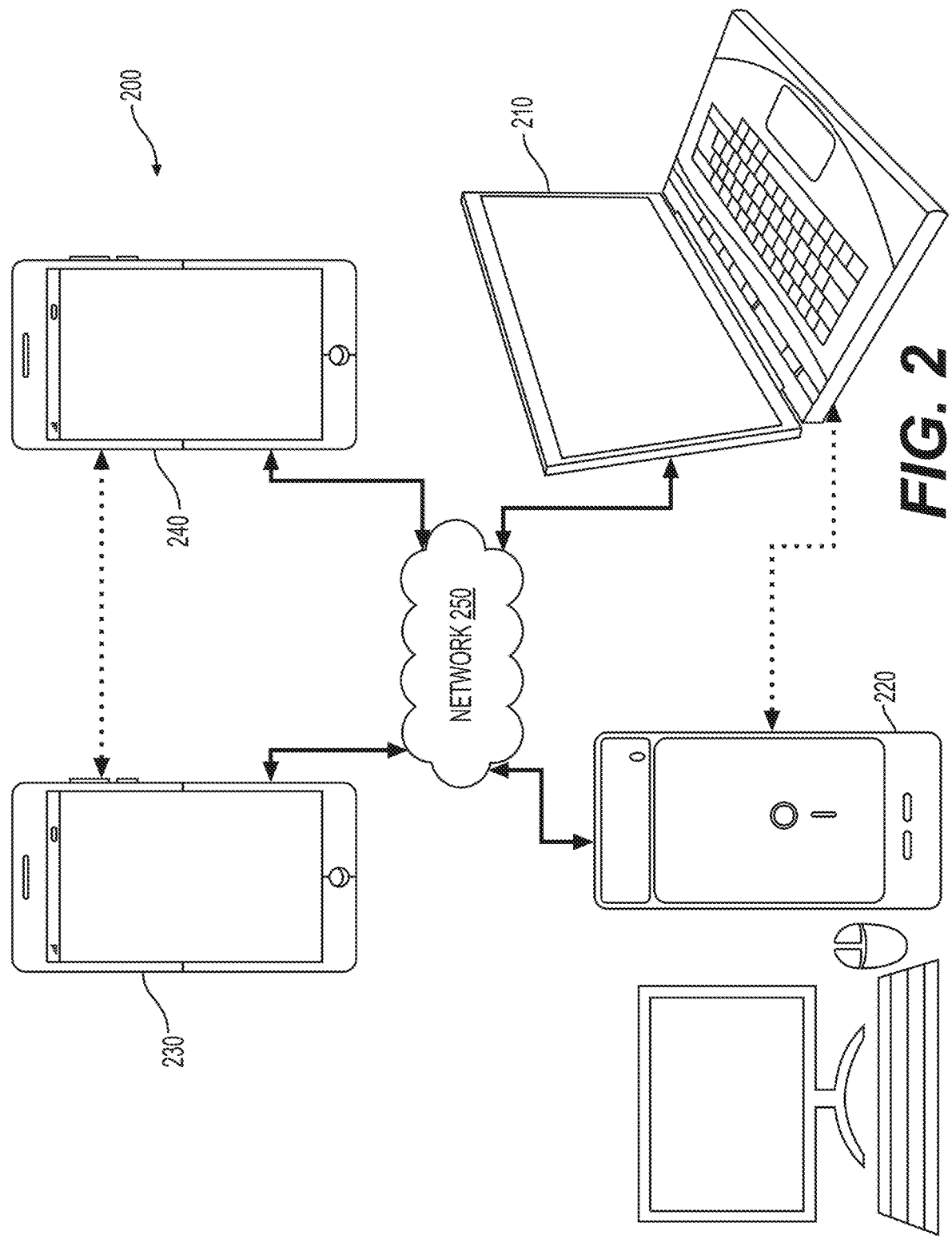
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bit streams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240)

via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
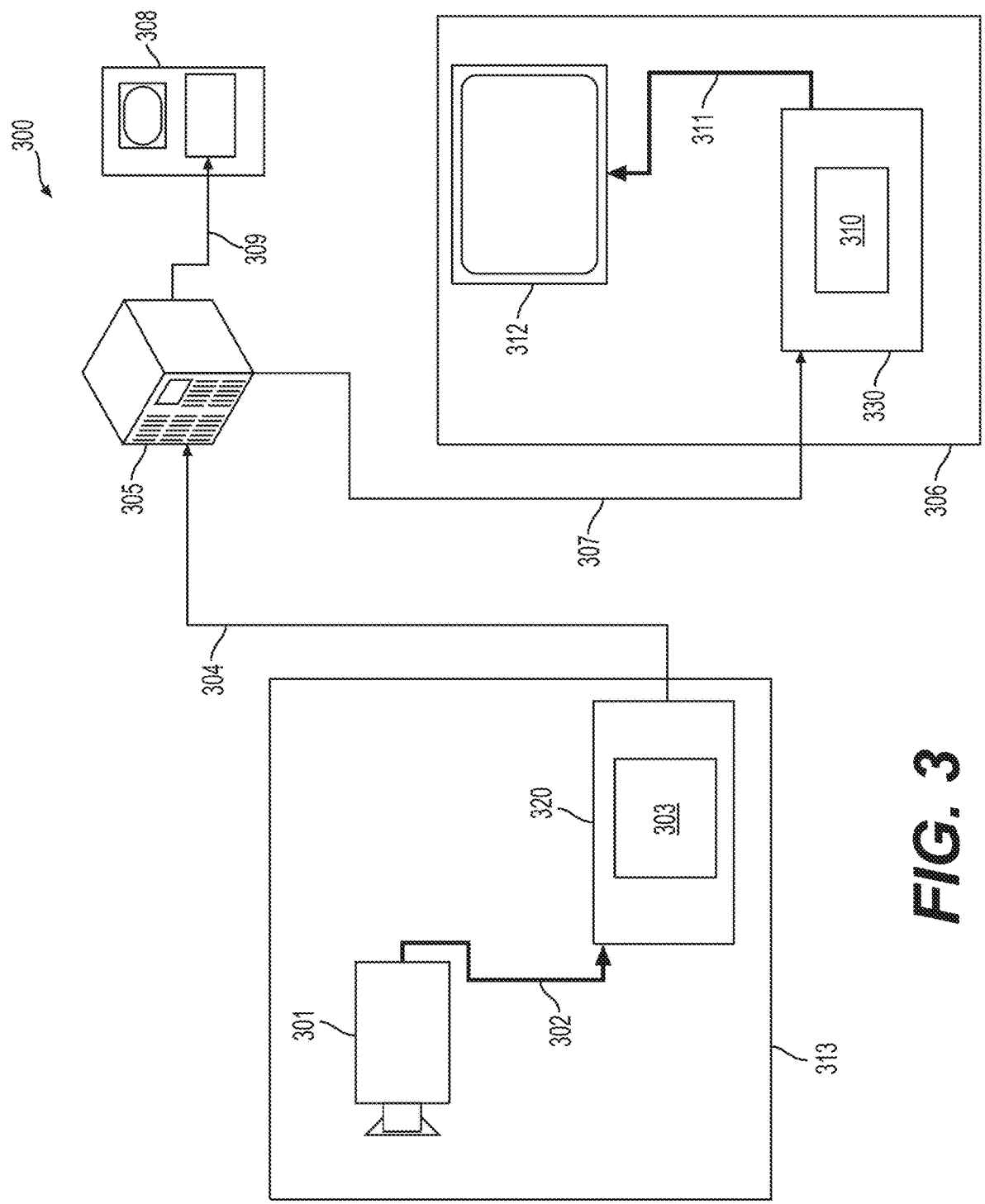
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bit streams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bit stream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bit streams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
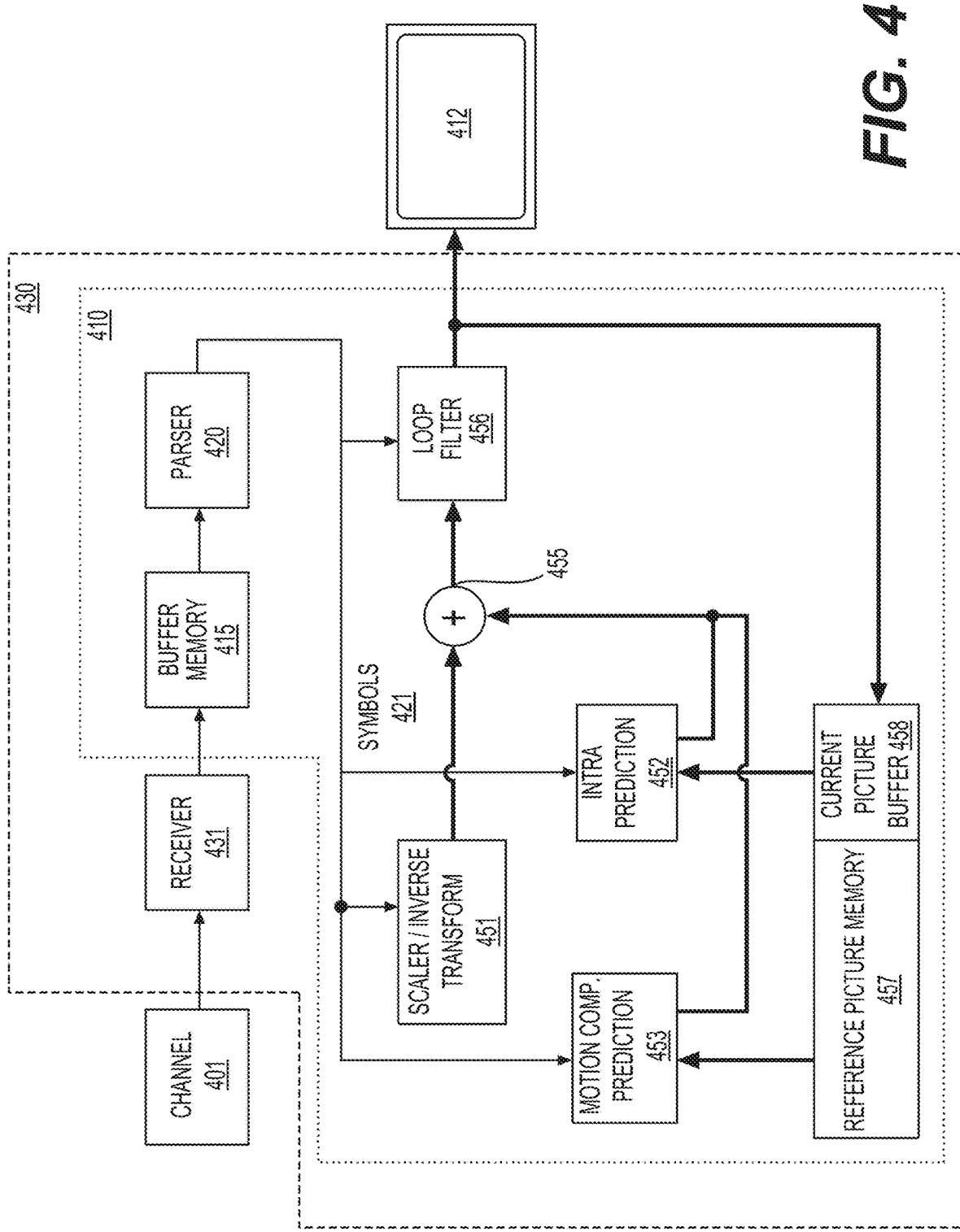
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bit stream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
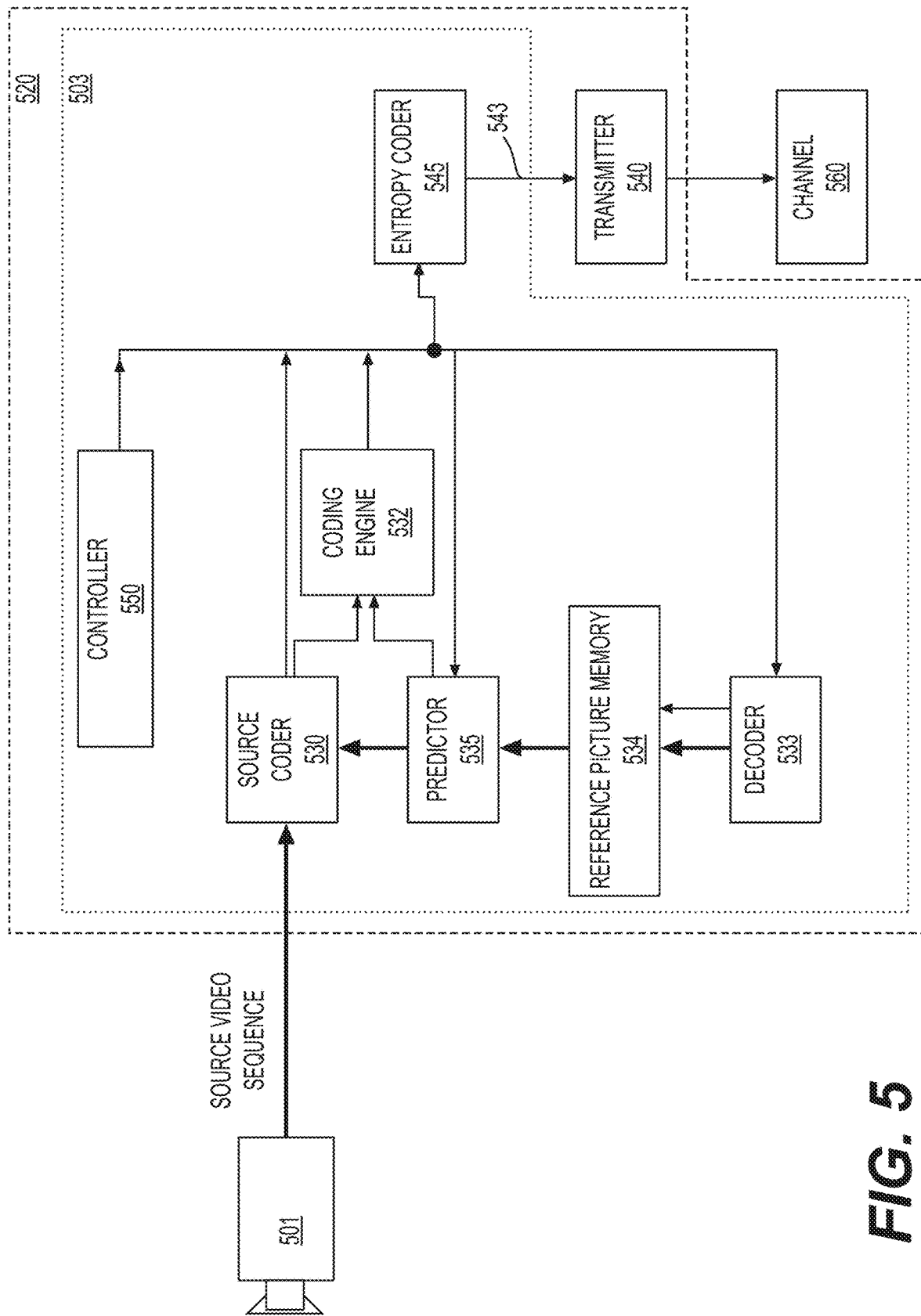
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bit stream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
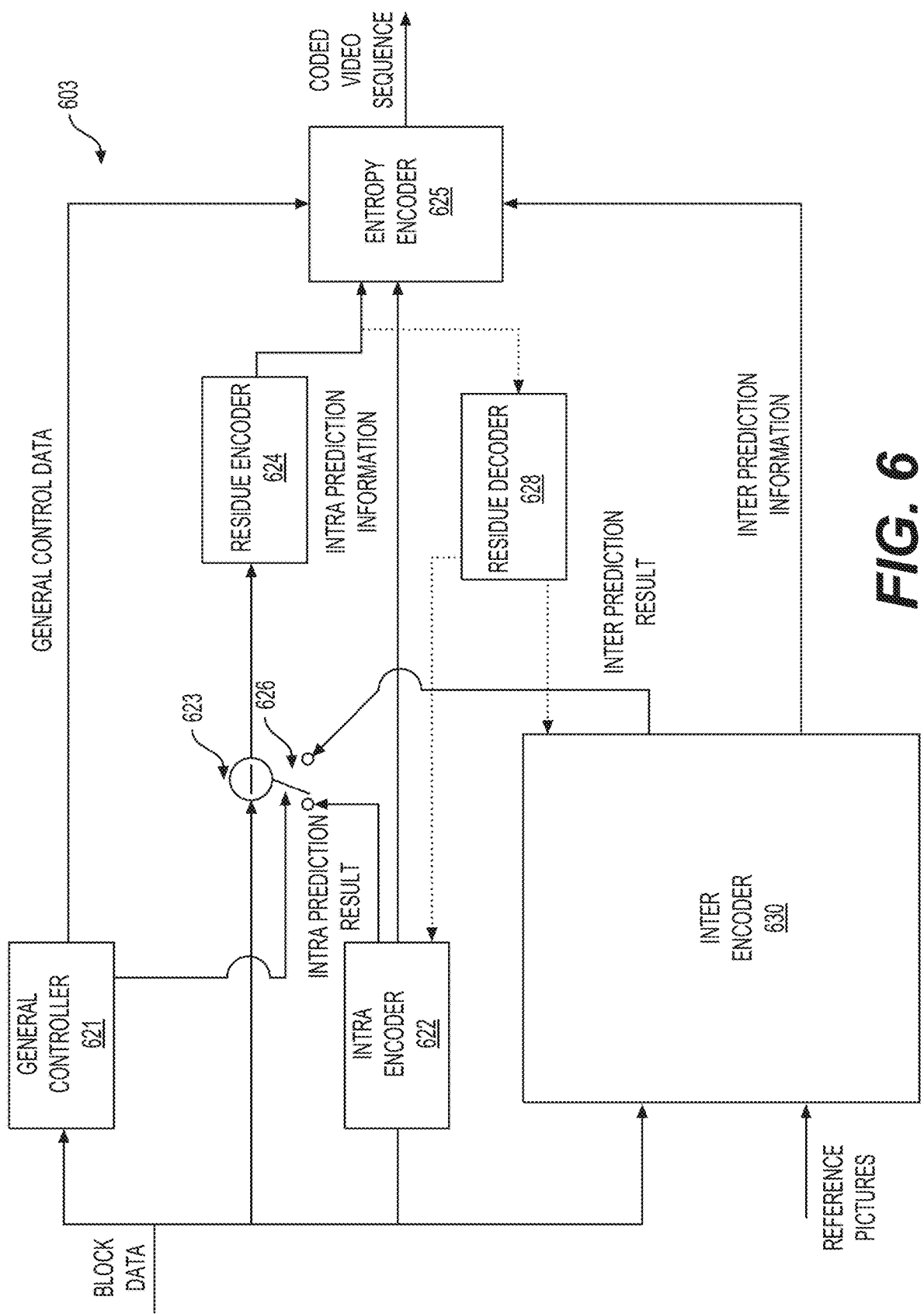
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bit stream; and when the mode is the inter mode, the general controller (621) controls the switch (626) to select the inter prediction result for use by the residue calculator (623), and controls the entropy encoder (625) to select the inter prediction information and include the inter prediction information in the bit stream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data in the frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bit stream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bit stream. Note that, according to the disclosed subject matter, when coding a block in the merge submode of either inter mode or bi-prediction mode, there is no residue information.

Figure 7:
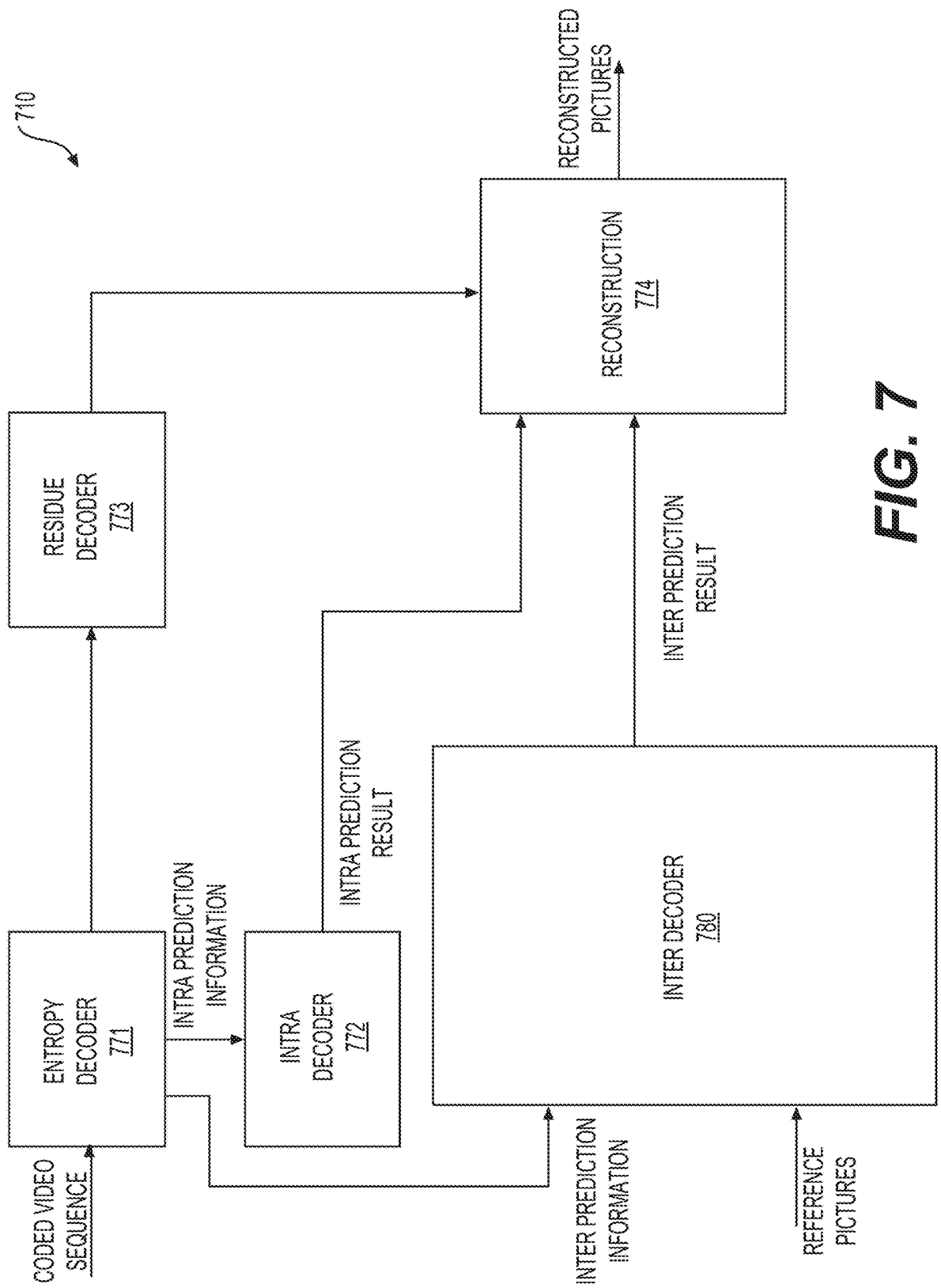
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide techniques to simplify affine motion compensation with prediction offsets.

Generally, a motion vector for a block can be coded either in an explicit way, to signal the difference to a motion vector predictor (e.g., advanced motion vector prediction or AMVP mode); or in an implicit way, to be indicated completely from one previously coded or generated motion vector. The later one is referred to as merge mode, meaning the current block is merged into a previously coded block by using its motion information.

Both the AMVP mode and the merge mode construct candidate list during decoding.

II. Inter Prediction Coding Techniques

1. Merge Mode

In various embodiments, a picture can be partitioned into blocks, for example, using a tree structure based partition scheme. The resulting blocks can then be processed with different processing modes, such as an intra prediction mode, an inter prediction mode (e.g., merge mode, skip mode, advanced motion vector prediction (AVMP) mode), and the like. When a currently processed block, referred to as a current block, is processed with a merge mode, a neighboring block can be selected from a spatial or temporal neighborhood of the current block. The current block can be merged with the selected neighboring block by sharing a same set of motion data (or referred to as motion information) from the selected neighboring block. This merge mode operation can be performed over a group of neighboring blocks, such that a region of neighboring blocks can be merged together and share a same set of motion data. During transmission from an encoder to a decoder, an index indicating the motion data of the selected neighboring block can be transmitted for the current block, instead of transmission of the whole set of motion data. In this way, an amount of data (bits) that are used for transmission of motion information can be reduced, and coding efficiency can be improved.

In the above example, the neighboring block, which provides the motion data, can be selected from a set of candidate positions. The candidate positions can be pre-defined with respect to the current block. For example, the candidate positions can include spatial candidate positions and temporal candidate positions. Each spatial candidate position is associated with a spatial neighboring block neighboring the current block. Each temporal candidate position is associated with a temporal neighboring block located in another coded picture (e.g., a previously coded picture). Neighboring blocks overlapping the candidate positions (referred to as candidate blocks) are a subset of all the spatial or temporal neighboring blocks of the current block. In this way, the candidate blocks can be evaluated for selection of a to-be-merged block instead of the whole set of neighboring blocks.

Figure 8:
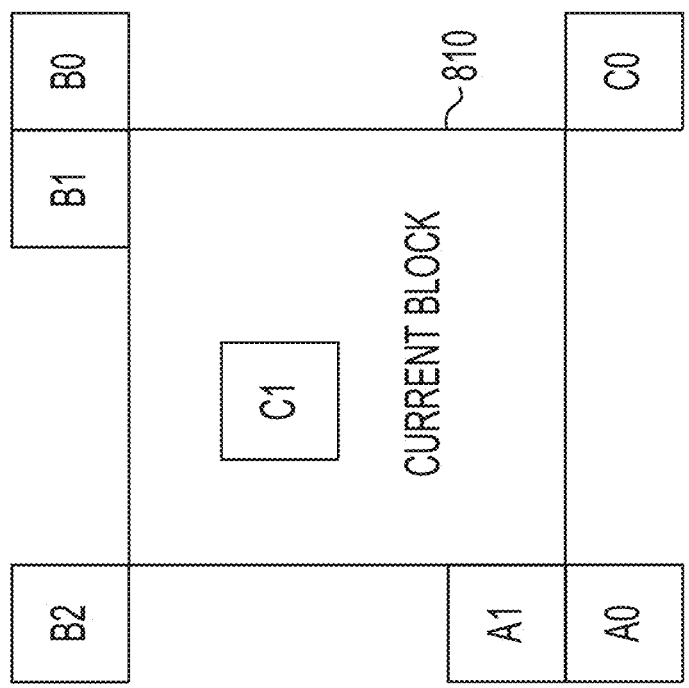
FIG. 8 shows an example of candidate positions from which a set of merge candidates can be selected to construct a merge candidate list in accordance with an embodiment.

FIG. 8 shows an example of candidate positions. From those candidate positions, a set of merge candidates can be selected to construct a merge candidate list. As shown, a current block (810) is to be processed with merge mode. A set of candidate positions {A1, B1, B0, A0, B2, C0, C1} are defined for the merge mode processing. Specifically, candidate positions {A1, B1, B0, A0, B2} are spatial candidate positions that represent positions of candidate blocks that are in the same picture as the current block (810). In contrast, candidate positions {C0, C1} are temporal candidate positions that represent positions of candidate blocks that are in another coded picture and neighbor or overlap a co-located block of the current block (810). As shown, the candidate position C1 can be located near (e.g., adjacent to) a center of the current block (810).

A candidate position can be represented by a block of samples or a sample in different examples. In FIG. 8, each candidate position is represented by a block of samples, for example, having a size of 4×4 samples. A size of such a block of samples corresponding to a candidate position can be equal to or smaller than a minimum allowable size of PBs (e.g., 4×4 samples) defined for a tree-based partitioning scheme used for generating the current block (810). Under such a configuration, a block corresponding to a candidate position can always be covered within a single neighboring PB. In an alternative example, a sample position (e.g., a bottom-right sample within the block A1, or a top-right sample within the block A0) may be used to represent a candidate position. Such a sample is referred to as a representative sample, while such a position is referred to as a representative position.

In one example, based on the candidate positions {A1, B1, B0, A0, B2, C0, C1} defined in FIG. 8, a merge mode process can be performed to select merge candidates from the candidate positions {A1, B1, B0, A0, B2, C0, C1} to construct a candidate list. The candidate list can have a predefined maximum number of merge candidates, represented as Cm. Each merge candidate in the candidate list can include a set of motion data that can be used for motion-compensated prediction.

The merge candidates can be listed in the candidate list according to a certain order. For example, depending on how the merge candidate is derived, different merge candidates may have different probabilities of being selected. The merge candidates having higher probabilities of being selected are positioned in front of the merge candidates having lower probabilities of being selected. Based on such an order, each merge candidate is associated with an index (referred to as a merge index). In one embodiment, a merge candidate having a higher probability of being selected will have a smaller index value such that fewer bits are needed for coding the respective index.

In one example, the motion data of a merge candidate can include horizontal and vertical motion vector displacement values of one or two motion vectors, one or two reference picture indices associated with the one or two motion vectors, and optionally an identification of which reference picture list is associated with an reference picture index.

In an example, according to a predefined order, a first number of merge candidates, Ca, is derived from the spatial candidate positions according to the order {A1, B1, B0, A0, B2}, and a second number of merge candidates, Cb=Cm−Ca, is derived from the temporal candidate positions according to the order {C0, C1}. The numerals A1, B1, B0, A0, B2, C0, C1 for representing candidate positions can also be used to refer to merge candidates. For example, a merge candidate obtained from candidate position A1 is referred to as the merge candidate A1.

In some scenarios, a merge candidate at a candidate position may be unavailable. For example, a candidate block at a candidate position can be intra-predicted, outside of a slice or tile including the current block (810), or not in a same coding tree block (CTB) row as the current block (810). In some scenarios, a merge candidate at a candidate position may be redundant. For example, one neighboring block of the current block (810) can overlap two candidate positions. The redundant merge candidate can be removed from the candidate list (e.g., by performing a pruning process). When a total number of available merge candidates (with redundant candidates being removed) in the candidate list is smaller than the maximum number of merge candidates Cm, additional merge candidates can be generated (e.g., according to a preconfigured rule) to fill the candidate list such that the candidate list can be maintained to have a fixed length. For example, additional merge candidates can include combined bi-predictive candidates and zero motion vector candidates.

After the candidate list is constructed, at an encoder, an evaluation process can be performed to select a merge candidate from the candidate list. For example, rate-distortion (RD) performance corresponding to each merge candidate can be calculated, and the one with the best RD performance can be selected. Accordingly, a merge index associated with the selected merge candidate can be determined for the current block (810) and signaled to a decoder.

At a decoder, the merge index of the current block (810) can be received. A similar candidate list construction process, as described above, can be performed to generate a candidate list that is the same as the candidate list generated at the encoder side. After the candidate list is constructed, a merge candidate can be selected from the candidate list based on the received merge index without performing any further evaluations in some examples. Motion data of the selected merge candidate can be used for a subsequent motion-compensated prediction of the current block (810).

A skip mode is also introduced in some examples. For example, in the skip mode, a current block can be predicted using a merge mode as described above to determine a set of motion data, however, no residue is generated, and no transform coefficients are transmitted. A skip flag can be associated with the current block. The skip flag and a merge index indicating the related motion information of the current block can be signaled to a video decoder. For example, at the beginning of a CU in an inter-picture prediction slice, a skip flag can be signaled that implies the following: the CU only contains one PU (2N×2N); the merge mode is used to derive the motion data; and no residual data is present in the bitstream. At the decoder side, based on the skip flag, a prediction block can be determined based on the merge index for decoding a respective current block without adding residue information. Thus, various methods for video coding with merge mode disclosed herein can be utilized in combination with a skip mode.

As an example, in an embodiment, when a merge flag or a skip flag is signaled as true in a bit stream, a merge index is then signaled to indicate which candidate in a merge candidate list will be used to provide motion vectors for a current block. Up to four spatially neighboring motion vectors and up to one temporally neighboring motion vectors can be added to the merge candidate list. A syntax MaxMergeCandsNum is defined as the size of the merge candidate list. The syntax MaxMergeVandsNum can be signaled in the bit stream.

2. Extended Merge Prediction Mode

In some embodiments, the above described merge candidate list is expanded, and an extended merge candidate list is used in merge mode. For example, the extended merge candidate list can be constructed by including the following five types of merge candidates sequentially subject to a maximum allowed size of merge candidates on the list:

1) Spatial motion vector predictor (MVP) from spatial neighbor coding units (CUs);
2) Temporal MVP from collocated CUs;
3) History-based MVP from a history buffer;
4) Pairwise average MVP; and
5) Zero MVs.

The term, coding unit, can refer to a prediction block, or a coding block partitioned from a picture.

In various embodiments, a size of the extended merge list can be signaled in a slice header, a tile group header, and the like. In an example, a maximum allowed size of an extended merge list is 6. In some embodiments, for a CU coded in merge mode, an index of a best merge candidate is encoded using truncated unary binarization (TU). The first bin of the merge index can be coded with context, and other bins can be coded with bypass coding.

Generation processes of different types of merge candidates on the extended merge candidate list are described below.

2.1 Spatial Candidates Derivation

Figure 9:
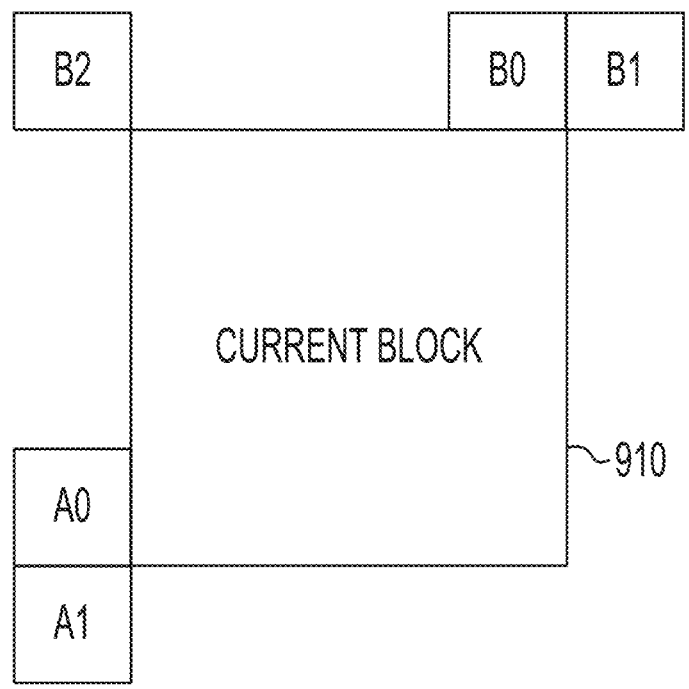
FIG. 9 shows another example of candidate positions from which a set of spatial merge candidates can be selected to construct an extended merge candidate list in accordance with an embodiment.

In an embodiment, the derivation of spatial merge candidates in an extended merge list is similar to that of the spatial merge candidates as described in section II. 1 Merge Mode. FIG. 9 shows spatial merge candidate positions of a current block (910) in accordance with an embodiment. A maximum of four merge candidates can be selected and derived among the candidate positions shown in FIG. 9. The order of the derivation can be A1, B1, B0, A0 and B2 in one example. In an example, the position B2 is considered only when any CU of position A1, B1, B0, A0 is not available (e.g., because it belongs to another slice or tile) or is intra coded.

Figure 10:
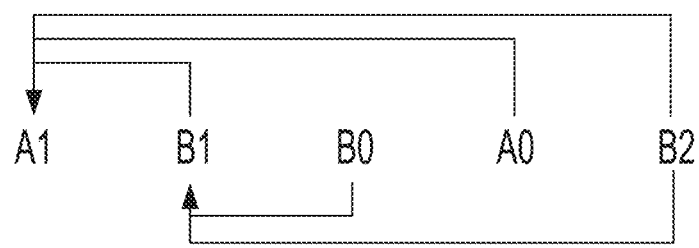
FIG. 10 shows an example of candidate pairs on an extended merge list for a redundancy check process in accordance with an embodiment.

After a candidate at position A1 is added to the extended candidate list, the addition of the other candidates can be subject to a redundancy check. By the redundancy check, merge candidates with same motion information are excluded from the extended merge list so that a coding efficiency can be improved. To reduce computational complexity, in an example, not all possible candidate pairs are considered in the redundancy check. Instead, only pairs linked with an arrow in FIG. 10 are considered. A candidate is not added to the merge list if a counterpart indicated in FIG. 10 is in the merge list and has the same or similar motion information as the to-be-added candidate in some examples.

2.2 Temporal Candidates Derivation

Figure 11:
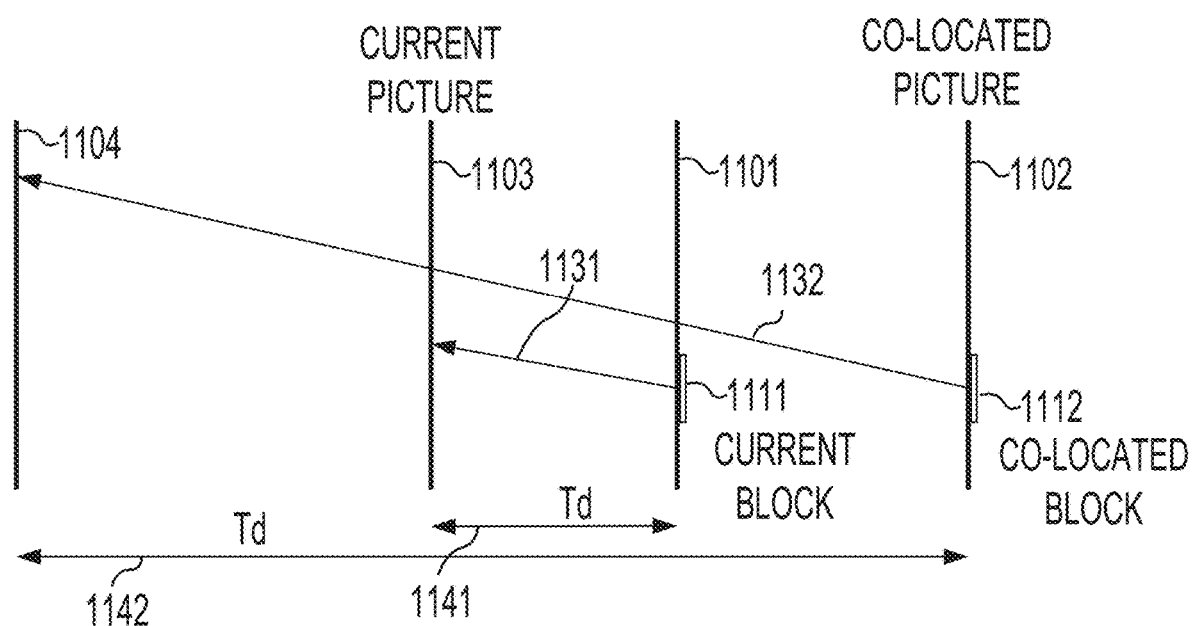
FIG. 11 shows an example of deriving a temporal merge candidate on an extended merge list in a current picture in accordance with an embodiment.

In an embodiment, only one temporal candidate is added to the extended merge list. FIG. 11 shows an example of deriving a temporal merge candidate (1131) of a current block (1111) in a current picture (1101) in accordance with an embodiment. The temporal merge candidate (1131) is derived by scaling a motion vector (1132) of a co-located block (1112) of the current block (1111) in a picture (1102) (referred to as a co-located picture). In an example, a reference picture index of the co-located picture is explicitly signaled, for example, in a slice header. In an example, a reference picture index of the temporal merge candidate (1131) is set to 0. In an embodiment, the scaling operation is based on distances of picture order count (POC), Tb (1141) and Td (1142). For example, Tb (1141) is defined to be a POC distance between a reference picture (1103) of the current block (1111) and the current picture (1101), while Td (1142) is defined to be a POC distance between a reference picture (1104) of the co-located block (1112) and the co-located picture (1102).

Figure 12:
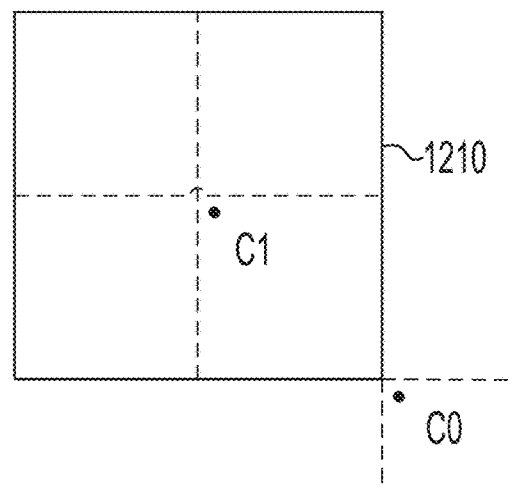
FIG. 12 shows candidate positions from which a temporal merge candidate on an extended merge list can be selected in accordance with an embodiment.

FIG. 12 shows candidate positions, C1 and C0, from which a temporal merge candidate of current block 1210 can be selected in accordance with an embodiment. In an embodiment, the position C0 is first checked to derive the temporal merge candidate. If a merge candidate at the position C0 is not available, for example, when a neighbor block at the C0 is not available, intra coded, or is outside of the current row of CTUs, the position C1 is used.

2.3 History-Based Merge Candidates Derivation

In some embodiments, history-based motion vector prediction (HMVP) merge candidates are added to an extended merge list of a current CU after the spatial and temporal candidate motion vector predictor (MVP). In HMVP, motion information of a previously coded block can be stored in a table (or a history buffer) and used as a MVP candidate for the current CU. Such motion information is referred to as HMVP candidates. The table with multiple HMVP candidates can be maintained during an encoding or decoding process. The table can be reset (emptied) when a new CTU row is encountered in one example. Whenever there is a non-subblock inter-coded CU, the associated motion information can be added to a last entry of the table as a new HMVP candidate in an embodiment.

In an embodiment, a size of an HMVP table, denoted by S, is set to be 6. Accordingly, up to 6 HMVP candidates may be added to the table. When inserting a new motion candidate to the table, a constrained first-in-first-out (FIFO) rule can be utilized in an embodiment. In addition, a redundancy check can be applied when adding a new HMVP candidate to find whether there is an identical HMVP in the table. If found, the identical HMVP candidate is removed from the table and all the HMVP candidates following the removed HMVP candidate are moved forward. The new HMVP candidate can then be added at the end of the table.

In an embodiment, HMVP candidates are used in an extended merge candidate list construction process. The latest several HMVP candidates in the table can be checked in order and inserted to the extended candidate list at positions after TMVP candidate in an embodiment. A redundancy check may be applied to determine if the HMVP candidates is similar or the same as a spatial or temporal merge candidate previously added to the extended merge list.

To reduce the number of redundancy check operations, the following simplifications are introduced in an embodiment:

(i) Number of HMPV candidates used for generation of an extended merge list is set as N<=4 and M=(8−N), wherein N indicates a number of existing candidates in the extended merge list and M indicates a number of available HMVP candidates in a history table.

(ii) Once a total number of available merge candidates in the extended merge list reaches a number of the maximally allowed merge candidates minus 1, the merge candidate list construction process from HMVP is terminated.

2.4 Pair-Wise Average Merge Candidates Derivation

In some embodiments, pairwise average candidates can be generated by averaging predefined pairs of candidates in a current merge candidate list. For example, the predefined pairs are defined as {(0, 1), (0, 2), (1, 2), (0, 3), (1, 3), (2, 3)} in an embodiment, where the numbers denote the merge indices to the merge candidate list. For example, the averaged motion vectors are calculated separately for each reference picture list. If both to-be-averaged motion vectors are available in one list, these two motion vectors are averaged even when they point to different reference pictures. If only one motion vector is available, the available one can be used directly. If no motion vector is available, the respective pair is skipped in one example.

2.5 Zero Motion Vector Predictors

In some embodiments, when an extended merge list is not full after pair-wise average merge candidates are added, zero MVPs are inserted at the end of the extended merge list until a maximum allowed merge candidate number is reached.

3. Triangular Prediction Mode (TPM)

A triangular prediction mode (TPM) can be employed for inter prediction in some embodiments. In an embodiment, the TPM is applied to CUs that are 8×8 samples or larger in size and are coded in skip or merge mode. In an embodiment, for a CU satisfying these conditions (8×8 samples or larger in size and coded in skip or merge mode), a CU-level flag is signaled to indicate whether the TPM is applied or not.

Figure 13:
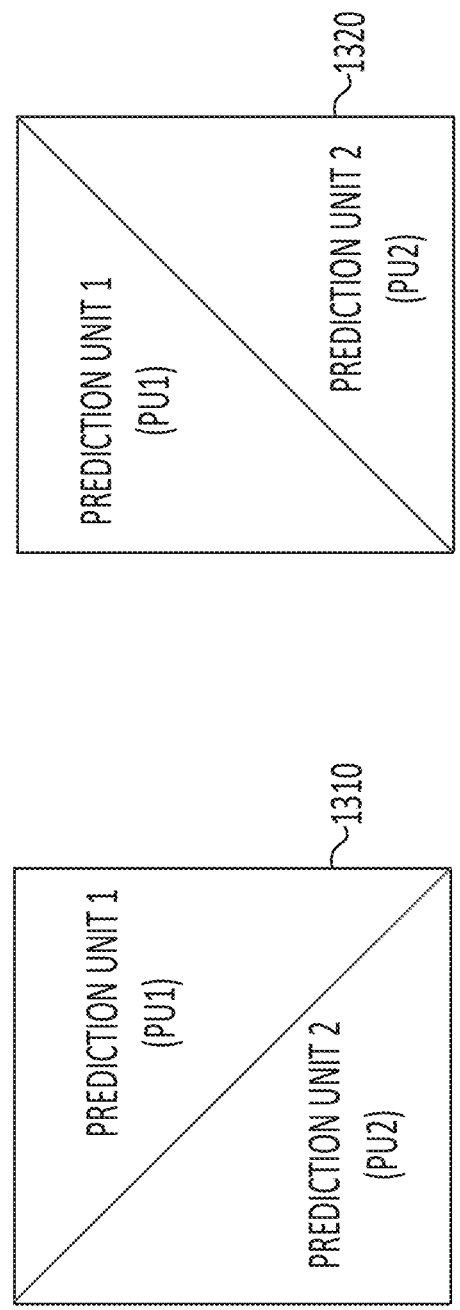
FIG. 13 shows examples of partitioning a coding unit into two triangular prediction units in accordance with an embodiment.

When the TPM is used, in some embodiments, a CU is split evenly into two triangle-shaped partitions, using either the diagonal split or the anti-diagonal split as shown in FIG. 13. In FIG. 13, a first CU (1310) is split from a top-left corner to a bottom-right corner resulting in two triangular prediction units, PU1 and PU2. A second CU (1320) is split from a top-right corner to a bottom-left corner resulting in two triangular prediction units, PU1 and PU2. Each triangular prediction unit PU1 or PU2 in the CU (1310) or CU (1320) is inter-predicted using its own motion information. In some embodiments, only uni-prediction is allowed for each triangular prediction unit. Accordingly, each triangular prediction unit has one motion vector and one reference picture index. The uni-prediction motion constraint can be applied to ensure that, similar to a conventional bi-prediction method, not more than two motion compensated predictions are performed for each CU. In this way, processing complexity can be reduced. The uni-prediction motion information for each triangular prediction unit can be derived from a uni-prediction merge candidate list. In some other embodiments, bi-prediction is allowed for each triangular prediction unit. Accordingly, the bi-prediction motion information for each triangular prediction unit can be derived from a bi-prediction merge candidate list.

In some embodiments, when a CU-level flag indicates that a current CU is coded using the TPM, an index, referred to as triangle partition index, is further signaled. For example, the triangle partition index can have a value in a range of [0, 39]. Using this triangle partition index, the direction of the triangle partition (diagonal or anti-diagonal), as well as the motion information for each of the partitions (e.g., merge indices (or referred to as TPM indices) to the respective uni-prediction candidate list) can be obtained through a lookup table at the decoder side. After predicting each of the triangular prediction unit based on the obtained motion information, in an embodiment, the sample values along the diagonal or anti-diagonal edge of the current CU are adjusted by performing a blending process with adaptive weights. As a result of the blending process, a prediction signal for the whole CU can be obtained. Subsequently, a transform and quantization process can be applied to the whole CU in a way similar to other prediction modes. Finally, a motion field of a CU predicted using the triangle partition mode can be created, for example, by storing motion information in a set of 4×4 units partitioned from the CU. The motion field can be used, for example, in a subsequent motion vector prediction process to construct a merge candidate list.

3.1 Uni-Prediction Candidate List Construction

Figure 14:
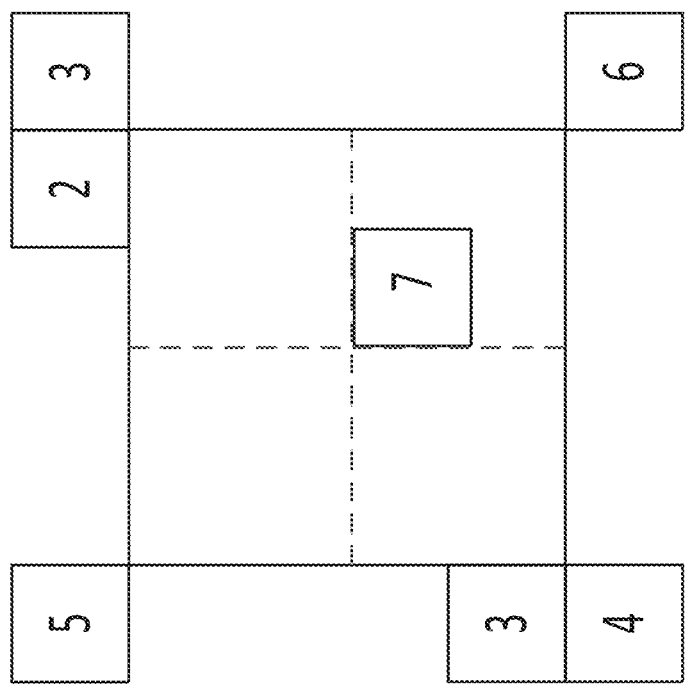
FIG. 14 shows an example of spatial and temporal neighboring blocks used to construct a uni-prediction candidate list for a triangular prediction mode in accordance with an embodiment.

In some embodiments, a merge candidate list for prediction of two triangular prediction units of a coding block processed with a TPM can be constructed based on a set of spatial and temporal neighboring blocks of the coding block. Such a merge candidate list can be referred to as a TPM candidate list or triangle merger mode candidate list with TPM candidates listed herein. In one embodiment, the merge candidate list is a uni-prediction candidate list. The uni-prediction candidate list includes five uni-prediction motion vector candidates in an embodiment. For example, the five uni-prediction motion vector candidates are derived from seven neighboring blocks including five spatial neighboring blocks (labeled with numbers of 1 to 5 in FIG. 14) and two temporal co-located blocks (labeled with numbers of 6 to 7 in FIG. 14).

In an example, the motion vectors of the seven neighboring blocks are collected and included in the uni-prediction candidate list according to the following order: first, the motion vectors of the uni-predicted neighboring blocks; then, for the bi-predicted neighboring blocks, the L0 motion vectors (that is, the L0 motion vector part of the bi-prediction MV), the L1 motion vectors (that is, the L1 motion vector part of the bi-prediction MV), and averaged motion vectors of the L0 and L1 motion vectors of the bi-prediction MVs. In an embodiment, if the number of candidates is less than five, zero motion vectors are added to the end of the list. In some other embodiments, the merge candidate list may include less than 5 or more than 5 uni-prediction or bi-prediction merge candidates that are selected from candidate positions that are the same or different from that shown in FIG. 14.

3.2 Lookup Table and Table Indices

In an embodiment, a CU is coded with a triangular partition mode with a TPM (or merge) candidate list including five TPM candidates. Accordingly, there are 40 possible ways to predict the CU when 5 merge candidates are used for each triangular PU. In other words, there can be 40 different combinations of split directions and merge (or TPM) indices: 2 (possible split directions)×5 (possible merge indices for a first triangular prediction unit)×5 (possible merge indices for a second triangular prediction unit)−5 (a number of possibilities when the pair of first and second prediction units shares a same merge index)). For example, when a same merge index is determined for the two triangular prediction units, the CU can be processed using a regular merge mode, instead of the triangular predication mode.

Accordingly, in an embodiment, a triangular partition index in the range of [0, 39] can be used to represent which one of the 40 combinations is used based on a lookup table. FIG. 15 shows an exemplary lookup table (1500) used to derive the split direction and merge indices based on a triangular partition index. As shown in the lookup table (1500), a first row (1501) includes the triangular partition indices ranging from 0 to 39; a second row (1502) includes possible split directions represented by 0 or 1; a third row (1503) includes possible first merge indices corresponding to a first triangular prediction unit and ranging from 0 to 4; and, a fourth row 1504 includes possible second merge indices corresponding to a second triangular prediction unit and ranging from 0 to 4.

For example, when a triangular partition index having a value of 1 is received at a decoder, based on a column (1520) of the lookup table (1500), it can be determined that the split direction is a partition direction represented by the value of 1, and the first and second merge indices are 0 and 1, respectively. As the triangle partition indices are associated with a lookup table, a triangle partition index is also referred to as a table index in this disclosure.

3.3 Adaptive Blending Along the Triangular Partition Edge

In an embodiment, after predicting each triangular prediction unit using respective motion information, a blending process is applied to the two prediction signals of the two triangular prediction units to derive samples around the diagonal or anti-diagonal edge. The blending process adaptively chooses between two groups of weighting factors depending on the motion vector difference between the two triangular prediction units. In an embodiment, the two weighting factor groups are as follows:

(1) 1st weighting factor group: $\{7/8, 6/8, 4/8, 2/8, 1/8\}$ for samples of a luma component and $\{7/8, 4/8, 1/8\}$ for samples of chroma component; and (2) 2nd weighting factor group: $\{7/8, 6/8, 5/8, 4/8, 3/8, 2/8, 1/8\}$ for samples of a luma component and $\{6/8, 4/8, 2/8\}$ for samples of a chroma component. The second weighting factor group has more luma weighting factors and blends more luma samples along the partition edge.

In an embodiment, the following condition is used to select one of the two weighting factor groups. When reference pictures of the two triangle partitions are different from each other, or when a motion vector difference between the two triangle partitions is larger than a threshold (e.g., 16 luma samples), the 2nd weighting factor group is selected. Otherwise, the 1st weighting factor group is selected.

Figure 16:
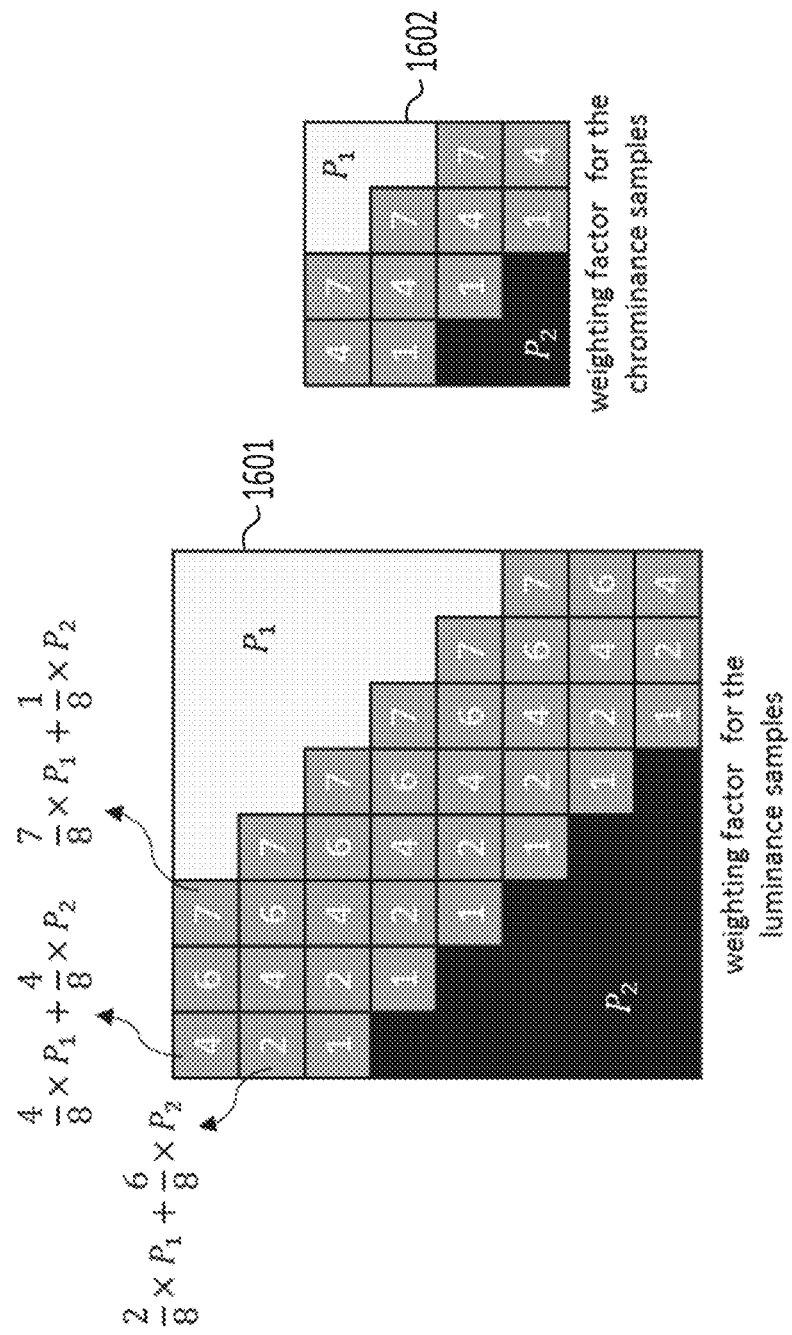
FIG. 16 shows an example of a coding unit applying a set of weighting factors in an adaptive blending process in accordance with an embodiment.

FIG. 16 shows an example of a CU applying the first weighting factor group. As shown, a first coding block (1601) includes luma samples, and a second coding block (1602) includes chroma samples. A set of pixels along a diagonal edge in the coding block (1601) or (1602) are labeled with the numbers 1, 2, 4, 6, and 7 corresponding to the weighting factors $7/8$, $6/8$, $4/8$, $2/8$, and $1/8$, respectively. For example, for a pixel labelled with the number of 2, a sample value of the pixel after a blending operation can be obtained according to:

$$\text{the blended sample value} = 2/8 \times P1 + 6/8 \times P2,$$

where P1 and P2 represent sample values at the respective pixel but belong to predictions of a first triangular prediction unit and a second triangular prediction unit, respectively.

Figure 17:
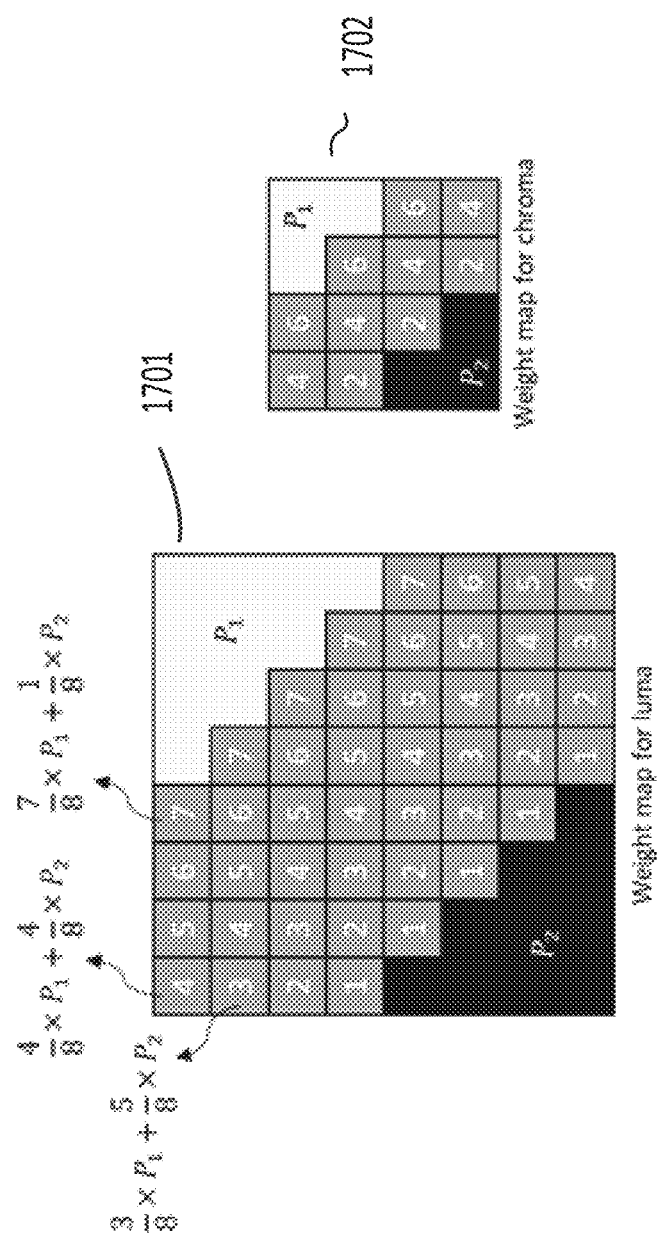
FIG. 17 shows an example of a coding unit applying another set of weighting factors in an adaptive blending process in accordance with an embodiment.

FIG. 17 shows an example of a CU applying the second weighting factor group. As shown, a first coding block (1701) includes luma samples, and a second coding block (1702) includes chroma samples. A set of pixels along a diagonal edge in the coding block (1701) or (1702) are labeled with the numbers 1, 2, 3, 4, 5, 6, and 7 corresponding to the weighting factors ⅞, 6/8, ⅝, 4/8, ⅜, 2/8, ⅛, respectively. For example, for a pixel labeled with the number of 3, a sample value of the pixel after a blending operation can be obtained according to:

the blended sample value=⅜×*P*1+⅝×*P*2, where P1 and P2 represent sample values at the respective pixel but belong to predictions of a first triangular prediction unit and a second triangular prediction unit, respectively.

3.4 Syntax Elements for Signaling Triangular Prediction Parameters

In some embodiments, a triangular prediction unit mode is applied to CUs in skip or merge mode. A block size of the CUs cannot be smaller than 8×8. For a CU coded in a skip or merge mode, a CU level flag is signaled to indicate whether the triangular prediction unit mode is applied or not for the current CU. In an embodiment, when the triangular prediction unit mode is applied to the CU, a table index indicating the direction for splitting the CU into two triangular prediction units and the motion vectors (or respective merge indices) of the two triangular prediction units are signaled. The table index ranges from 0 to 39. A lookup table, such as the table described in FIG. 15, is used for deriving the splitting direction and motion vectors from the table index.

As descried above, three parameters, a split direction, a first merge index (TPM index) corresponding to a first triangular prediction unit, and a second merge index (TPM index) corresponding to a second triangular prediction unit, are generated when a TPM is applied to a coding block. As described, in some examples, the three triangular prediction parameters are signaled from an encoder side to a decoder side by signaling a table index. Based on a lookup table (e.g., the lookup table (1500) in the FIG. 15 example), the three triangular prediction parameters can be derived using the table index received at the decoder side. However, additional memory space is required for storing the lookup table at a decoder, which may become a burden in some implementations of the decoder. For example, the additional memory may lead to an increase in cost and power consumption of the decoder.

To solve the above problem, in some embodiments, instead of signaling a table index and relying on a lookup table to interpret the table index, three syntax elements are signaled from an encoder side to a decoder side. The three triangular prediction parameters (the split direction and two merge or TPM indices) can be derived or determined at the decoder side based on the three syntax elements without using the lookup table. The three syntax elements can be signaled in any order for the respective coding block in an embodiment.

In an embodiment, the three syntax elements include a split direction syntax element, a first index syntax element, and a second index syntax element. The split direction syntax element can be used to determine the split direction parameter. The first and second index syntax elements in combination can be used to determine the parameters of the first and second merge or TPM indices.

For the split direction syntax element, in an embodiment, the split direction syntax element takes a value of 0 or 1 to indicate whether the split direction is from a top-left corner to a bottom-right corner or from a top-right corner to a bottom-left corner.

For the first and second index syntax elements, in an embodiment, the first index syntax element is configured to have a value of the parameter of the first merge index, while the second index syntax element is configured to have a value of the second merge index when the second merge index is smaller than the first merge index, and have a value of the second merge index minus one when the second merge index is greater than the first merge index (the second and first merge index are supposed to take different value as described above, so the second and first merge index are not the same).

As an example, in an embodiment, a merge candidate list has a length of 5 merge candidates. Accordingly, the first index syntax element takes a value of 0, 1, 2, 3, or 4, while the second index syntax element takes a value of 0, 1, 2, or 3. For example, in a case that the first merge index parameter has a value of 2, and the second merge index parameter has a value of 4, to signal the first and second merge index, the first and second index syntax elements would have a value of 2 and 3, respectively.

In an embodiment, a coding block is located at a position having coordinates of (xCb, yCb) with respect to a reference point in a current picture, where xCb and yCb represent the horizontal and vertical coordinates of the current coding block, respectively. In some embodiments, xCb and yCb are aligned with the horizontal and vertical coordinates with 4×4 granularity. Accordingly, the split direction syntax element is represented as split_dir[xCb][yCb]. The first index syntax element is represented as merge_triangle_idx0[xCb][yCb] and the second index syntax element is represented as merge_triangle_idx1[xCb][yCb].

For example, in VVC working draft 4 (JVET-M1001), the syntax of the merge mode and the TPM, and related semantics are as described in Table 1.

TABLE 1

| | Descriptor |
|---|---|
| merge_data( x0, y0, cbWidth, cbHeight ) { | |
|   if( CuPredModel [ x0 ][ y0 ] = = MODE_IBC { | |
|     if( MaxNumMergeCand > 1 ) | |
|       merge_idx[ x0 ][ y0 ] | ae(v) |
|   } else { | |
|     mmvd_flag[ x0 ][ y0 ] | ae(v) |
|     if( mmvd_flag[ x0 ][ y0 ] = = 1) { | |
|       mmvd_merge_flag[ x0 ][ y0 +9 | ae(v) |
|       mmvd_distance_idx[ x0 ][ y0 ] | ae(v) |
|       mmvd_direction_idx[ x0 ][ y0 ] | ae(v) |
|     } else { | |
|       if( MaxNumSubblockMergeCand > 0 && cbWidth >= 8 && cbHeight >= 8 ) | |
|         merge_subblockflag[ x0 ][ y0 ] | ae(v) |
|       if( merge_subblock_flag[ x0 ][ y0 ] = = 1) { | |
|         if( MaxNumSubblockMergeCand > 1 ) | |
|           merge_subblock_idx[ x0 ][ y0 ] | ae(v) |

TABLE 1-continued

```
                                                                            Descriptor
  } else {
    if( sps_ciip_enabled_flag && cu_skip_flag[ x0 ][ y0 ] = = 0 &&
      ( cbWidth * chHeight ) >= 64 && cbWidth < 128 && cbHeight < 128) {
      ciip_flag[ x0 ][ y0 ]                                                  ae(v)
      if( ciip_flag[ x0 ][ y0 ] ) {
        if ( cbWidth <= 2 * cbHeight | | cbHeight <= 2 * cbWidth )
          ciip_luma_mpm_flag[ x0 ][ y0 ]                                     ae(v)
        if( ciip_luma_mpm_flag[ x0 ][ y0 ] )
          ciip_luma_mpin_idx[ x0 ][ y0 ]                                     ae(v)
      }
    }
    if( sps_triangle_enabled_flag && tile_group_type = = B &&
      ciip_flag[ x0 ][ y0 ] = = 0 && cbWidth * chHeight >= 64)
      merge_triangle_flag[ x0 ][ y0 ]                                        ae(v)
    if( merge_triangle_flag[ x0 ][ y0 ] ) {
      merge_triangle_split_dir[ x0 ][ y0 ]                                   ae(v)
      merge_triangle_idx0[ x0 ][ y0 ]                                        ae(v)
      merge_triangle_idx1[ x0 ][ y0 ]                                        ae(v)
    } else if( MaxNumMergeCand > 1 )
      merge_idx[ x0 ][ y0 ]                                                  ae(v)
  }
 }
}
```

In Table 1, if merge_triangle_flag[x0][y0] equals to 1, it specifies that for the current coding unit, when decoding a tile group, triangular shape based motion compensation is used to generate the prediction samples of the current coding unit. If merge_triangle_flag[x0][y0] equals to 0, it specifies that the coding unit is not predicted by triangular shape based motion compensation. When merge_triangle_flag[x0][y0] is not present, it is inferred to be equal to 0. In addition, merge_triangle_split_dir[x0][y0] specifies the splitting direction of merge triangle mode. The array indices x0, y0 specify the location (x0, y0) of the top-left luma sample of the coding block relative to the top-left luma sample of the picture. When merge_triangle_split_dir[x0][y0] is not present, it is inferred to be equal to 0. Further, merge_triangle_idx0[x0][y0] specifies the first merging candidate index of the triangular shape based motion compensation candidate list where x0, y0 specify the location (x0, y0) of the top-left luma sample of the coding block relative to the top-left luma sample of the picture. When merge_triangle_idx0[x0][y0] is not present, it is inferred to be equal to 0. Similarly, merge_triangle_idx1[x0][y0] specifies the second merging candidate index of the triangular shape based motion compensation candidate list where x0, y0 specify the location (x0, y0) of the top-left luma sample of the coding block relative to the top-left luma sample of the picture. When merge_triangle_idx1[x0][y0] is not present, it is inferred to be equal to 0.

III. Flexible Maximum Allowed Number of TPM Candidates

As described above, in some examples, a TPM candidate list may include a fixed number of 5 TMP candidates. However, under certain situations, the maximum allowed number of TMP candidates is desired to be flexible in order to achieve a better tradeoff between complexity and coding efficiency. Accordingly, in some embodiments, a maximum allowed number of TPM candidates for coding a set of blocks with TPM can be signaled in a bit stream. For example, the maximum allowed number of TPM candidates can be signaled in a sequence parameter set (SPS), a picture parameter set (PPS), a slice header, a tile header, a tile group header, or the like. In some embodiments, the maximum allowed number of TMP candidates is denoted by MaxNumTriangleMergeCand.

In an embodiment, a maximum allowed number of TPM candidates is restricted to be an integer from 0 to a maximum allowed number of merge candidates in a merge mode. The merge mode can be the merge mode described at the section of II. 1 or the extended merge prediction mode described at the section of II. 2. For example, in an embodiment, the merge mode that provides a basis for limiting the maximum allowed number of TPM candidates can include the following types of merge candidates: (i) Spatial motion vector predictor (MVP) from spatial neighbor coding units (CUs); (ii) Temporal MVP from collocated CUs; (iii) History-based MVP from a history buffer; or (iv) Pairwise average MVP, and may not include affine based merge candidates or sub-block based merge candidates.

In various examples, the maximum allowed number of merge mode candidates can be different. In an embodiment, the maximum allowed number of merge mode candidates can be 5 or 6. In an embodiment, limiting the maximum allowed number of TPM candidates by the maximum allowed number of merge mode candidates can reduce implementation complexity of an encoder or decoder that employs both TPM and merge mode as coding tool options.

In an embodiment, a maximum allowed number of TPM candidates is signaled directly. For example, a syntax element having a value equal to the maximum allowed number of TPM candidates can be signaled.

In an embodiment, to improve coding efficiency, a difference between a maximum allowed number of TPM candidates and a maximum allowed number of merge mode candidates is signaled. The maximum allowed number of merge mode candidates may be signaled in a tile group header. In an embodiment, a maximum allowed number of merge mode candidates is signaled first. Then, a difference between the maximum allowed number of merge mode candidates and a maximum allowed number of TPM candidates is signaled. The maximum allowed number of TPM candidates is only signaled when the maximum allowed number of merge mode candidates is not smaller than 2. In another embodiment, if the maximum allowed number of merge mode candidates is not signaled, the maximum allowed number of TPM candidates is inferred as 0. In another embodiment, the maximum allowed number of TPM candidates is not allowed to be greater than the maximum allowed number of merge mode candidates. In another embodiment, the maximum allowed number of TPM candidates is not signaled, but set to the maximum allowed number of merge mode candidates.

In an embodiment, max_num_merge_cand_minus_max_num_triangle_cand is signaled, which specifies the maximum allowed number of TPM candidates supported in the tile group subtracted from the maximum allowed number of merge mode candidates, denoted as MaxNumMergeCand. Thus, the maximum allowed number of TPM candidates, MaxNumTriangleMergeCand can be determined according to:

MaxNumTriangleMergeCand=MaxNumMergeCand−max_num_merge_cand_minus_max_num_triangle_cand In an embodiment, the value of MaxNumTriangleMergeCand can either equals to 0, or is an integer from 2 to the maximum allowed number of merge candidates. In an embodiment, when max_num_merge_cand_minus_max_num_triangle_cand is not signaled, MaxNumTriangleMergeCand is inferred as 0. In an embodiment, when MaxNumTriangleMergeCand is 0, TPM is not allowed to be used for the tile group.

Table 2 shows an example of syntax transmission according to the above embodiment. In Table 2, tile_group_header( ) indicates a start of a syntax transmission of a tile group header. When the sps_triangle_enable_flag is true (indicating a TPM is enabled in an SPS that regulates the current tile group) and the maximum allowed number of merge mode candidates is greater than or equal to 2, the syntax element, max_num_merge_cand_minus_max_num_triangle_cand is transmitted.

TABLE 2

| | Descriptor |
|---|---|
| tile_group_header( ) { | |
|   tile_group_pic_parameter_set_id | ue(v) |
|   if( rect_tile_group_flag \|\| NumTilesInPic > 1 ) | |
|     tile_group_address | u(v) |
|   if( !rect_tile_group_flag && !single_tile_per_group_flag ) | |
|     num_tiles_in_tile_group_minus1 | ue(v) |
|   tile_group_type | ue(v) |
|   tile_group_pic_order_cnt_lsb | u(v) |
|   if( nal_unit_type != IDR_W_RADL && nal_unit_type != IDR_N_LP ) { | |
|     for( i = 0; i < 2; i++ ) { | |
|       if( num_ref_pic_lists_in_sps[ i ] > 0 && | |
|         ( i == 0 \|\| ( i == 1 && rpl1_idx_present_flag ) ) ) | |
|         ref_pic_list_sps_flag[ i ] | u(1) |
|       if( ref_pic_list_sps_flag[ i] ) { | |
|         if( num_ ref_pic_lists_in_sps[ i ] > 1 && | |
|           (i == 0 \|\| (i == 1 && rpl1_idx_present_flag ) ) ) | |
|           ref_pic_list_idx[ i ] | u(v) |
|       } else | |
|         ref_pic_list_struct( i, num_ref_pic_lists_in_sps[ i ] ) | |
|       for( j = 0; j < NumLtrpEntries[ i ][ RplsIdx[ i ] ]; j++ ) { | |
|         delta_poc_msb_present_flag[ i ][ j ] | u(1) |
|         if( delta_poc_msb_present_flag[ i ][ j ] ) | |
|           delta_poc_msb_cycle_lt[ i ][ j ] | ue(v) |
|       } | |
|     } | |
|     if( tile_group_type == P \|\| tile_group_type == B ) { | |
|       num_ref_idx_active_override_flag | u(1) |
|       if( num_ref_idx_active_override_flag ) | |
|         for( i = 0; i < ( tile_group_type == B ? 2: 1 ); i++) | |
|           if( num_ref_entries [ i ][ i ] ] > 1 ) | |
|             num_ref_idx_active_minus1[ i ] | ue(v) |
|     } | |
|   } | |
|   if( partition_constraints_override_enabled_flag ) { | |
|     partition_constraints_override_flag | ue(v) |
|     if( partition_constraints_override_flag ) { | |
|       tile_group_log2_diff_min_qt_min_cb_luma | ue(v) |
|       tile_group_max_mtt_hierarchy_depth_luma | ue(v) |
|       if( tile_group_max_mtt_hierarchy_depth_luma != 0 ) | |
|         tile_group_log2_diff_max_bt_min_qt_luma | ue(v) |
|         tile_group_log2_diff_max_tt_min_qt_luma | ue(v) |
|       } | |
|       if( tile_group_type == 1 && qtbtt_dual_tree_intra_flag ) { | |
|         tile_group_log2_diff_min_qt_min_cb_chroma | ue(v) |
|         tile_group_max_mtt_hierarchy_depth_chroma | ue(v) |
|         if( tile_group_max_mtt_hierarchy_depth_chroma != 0) | |
|           tile_group_log2_diff_max_bt_min_qt_chroma | ue(v) |
|           tile_group_log2_diff_max_tt_min_qt_chroma | ue(v) |
|         } | |
|       } | |
|     } | |
|   } | |
|   if ( tile_group_type != I ) { | |
|     if( sps_temporal_mvp_enabled_flag ) | |
|       tile_group_temporal_mvp_enabled_flag | u(1) |
|     if( tile_group_type == B ) | |

TABLE 2-continued

| | Descriptor |
|---|---|
|     mvd_l1_zero_flag | u(1) |
|     if( cabac_init_present_flag ) | |
|       cabac_init_flag | u(1) |
|     if( tile_group_temporal_mvp_enabled_flag ) { | |
|       if( tile_group_type = = B ) | |
|         collocated_from_l0_flag | u(1) |
|     } | |
|     if( ( weighted_pred_flag && tile_group_type = = P) \|\| | |
|       ( weighted_bipred_flag && tile_group = = B ) ) | |
|       pred_weight_table( ) | |
|     six_minus_max_num_merge_cand | ue(v) |
|     if( sps_affine_enabled_flag ) | |
|       five_ minus_ max_num _subblock_merge_cand | ue(v) |
|     if( sps_fpel_mmvd_enabled_flag ) | |
|       tile_group_fpel_mmvd_enabled_flag | u(1) |
|     if( sps_triangle_enabled_flag && MaxNumMergeCand >= 2 ) | |
|       max_num_merge_cand_minus_max_num_triangle_cand | ue(v) |
|   } else if ( sps_ibc_enabled_flag ) | |
|     six_minus_ max_num_merge_cand | ue(v) |
|   tile_group_qp_delta | se(v) |
|   if( pps_tile_group_chroma_qp_offsets_present_flag ) { | |
|     tile_group_cb_qp_offset | se(v) |
|     tile_group_cr_qp_offset | se(v) |
|   } | |
|   if( sps_sao_enabled_flag ) { | |
|     tile_group_sao_luma_flag | u(1) |
|     if( ChromaArrayType != 0 ) | |
|       tile_group_sao_chroma_flag | u(1) |
|   } | |
|   if( sps_alf_enabled_flag ) { | |
|     tile_group_alf_enabled_flag | u(1) |
|     if( tile_group_alf_enabled_flag ) | |
|       title_group_aps_id | u(5) |
|   } | |
|   dep_quant_enabled_flag | u(1) |
|   if( !dep_quant_enabled_flag ) | |
|     sign_data_hiding_enabled_flag | u(1) |
|   if( deblocking_filter_override_enabled_flag ) | |
|     deblocking_filter_override_flag | u(1) |
|   if( deblocking_filter_override_flag ) { | |
|     title_group_deblocking_filter_disabled_flag | u(1) |
|     if( !tile_group_deblocking_filter_disabled_flag ) { | |
|       tile_group_beta_offset_div2 | se(v) |
|       tile_group_tc_offset_div2 | se(v) |
|     } | |
|   } | |
|   if( NumTilesInCurrTileGroup > 1 ) { | |
|     offset_len_minus1 | ue(v) |
|     for( i = 0; i < NumTilesInCurrTileGroup − 1; i++ ) | |
|       entry_point_offset_minus1[ i ] | u(v) |
|   } | |
|   byte_alignment( ) | |
| } | |

In an embodiment, the usage of TPM may be limited based on the maximum allowed number of TPM candidates (denoted as MaxNumTriangleMergeCand) which is signaled in the tile group header. For example, TPM is only used when MaxNumTriangleMergeCand>=N. Otherwise, TPM should not be used. Table 3 shows an exemplary syntax table according to the above embodiment, where N=2. In Table 3, the merger triangle flag is transmitted only when the maximum number of triangular merge mode candidates is greater than or equal to 2. As a result, TPM is only used when the maximum allowed number of TPM candidates is greater than or equal to 2.

TABLE 3

| | Descriptor |
|---|---|
| merge_data( x0, y0, cbWidth, cbHeight ) { | |
| ... | |
|   if( sps_triangle_enabled_flag && tile_group_type = = B && | |

TABLE 3-continued

| | Descriptor |
|---|---|
|     ciip_flag[ x0 ][ y0 ] = = 0 && cbWidth * cbHeight >= 64 && MaxNumTriangleMergeCand >= 2) | |
|     merge_triangle_flag[ x0 ][ y0 ] | ae(v) |
|   if( merge _triangle_flag[ x0 ][ y0 ] ) { | |
|     merge_triangle_split_dir[ x0 ][ y0 ] | ae(v) |
|     merge_triangle_idx0[ x0 ][ y0 ] | ae(v) |
|     merge_triangle_idx1[ x0 ][ y0 ] | ae(v) |
|   } else if( MaxNumMergeCand > 1 ) | |
|     merge_idx[ x0 ][ y0 ] | ae(v) |
| } | |
| ... | |
| } | |

In an embodiment, when MaxNumTriangleMergeCand is greater than 0, the indices of merge candidates to be used for the triangular merge mode (merge_triangle_idx0 and merge_triangle_idx1) may be signaled. The value of merge_triangle_idx0 and merge_triangle_idx1 may be updated based on the maximum allowed number of TPM candidates. For example, a maximum number of merge_triangle_idx0 equals to the maximum allowed number of TPM candidates minus one, and a maximum number of merge_triangle_idx1 equals to the maximum allowed number of TPM candidates minus two. The binarization of merge_triangle_idx0 and merge_triangle_idx1 is as shown in the following Table 4.

TABLE 4

| | | | |
|---|---|---|---|
| merge_data( ) | mmvd_flag[ ][ ] | FL | cMax = 1 |
| | mmvd_merge_flag[ ][ ] | FL | cMax = 1 |
| | mmvd_distance_idx[ ][ ] | TR | cMax = 7, cRiceParam = 0 |
| | mmvd_direction_idx[ ][ ] | FL | cMax = 3 |
| | ciip_flag[ ][ ] | FL | cMax = 1 |
| | ciip_luma_mpm_flag[ ][ ] | FL | cMax = 1 |
| | ciip_luma_mpm_idx[ ][ ] | TR | cMax = 2, cRiceParam = 0 |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | merge_triangle_flag[ ][ ] | FL | cMax = 1 |
| | merge_triangle_idx[ ][ ] | FL | cMax = 1 |
| | merge_triangle_idx0[ ][ ] | TR | cMax = MaxNumTriangleMergeCand − 1, cRiceParam = 0 |
| | merge_triangle_idx1[ ][ ] | TR | cMax = MaxNumTriangleMergeCand − 2, cRiceParam = 0 |
| | merge_idx[ ][ ] | TR | cMax = MaxNumMergeCand − 1, cRiceParam = 0 |

Figure 18:
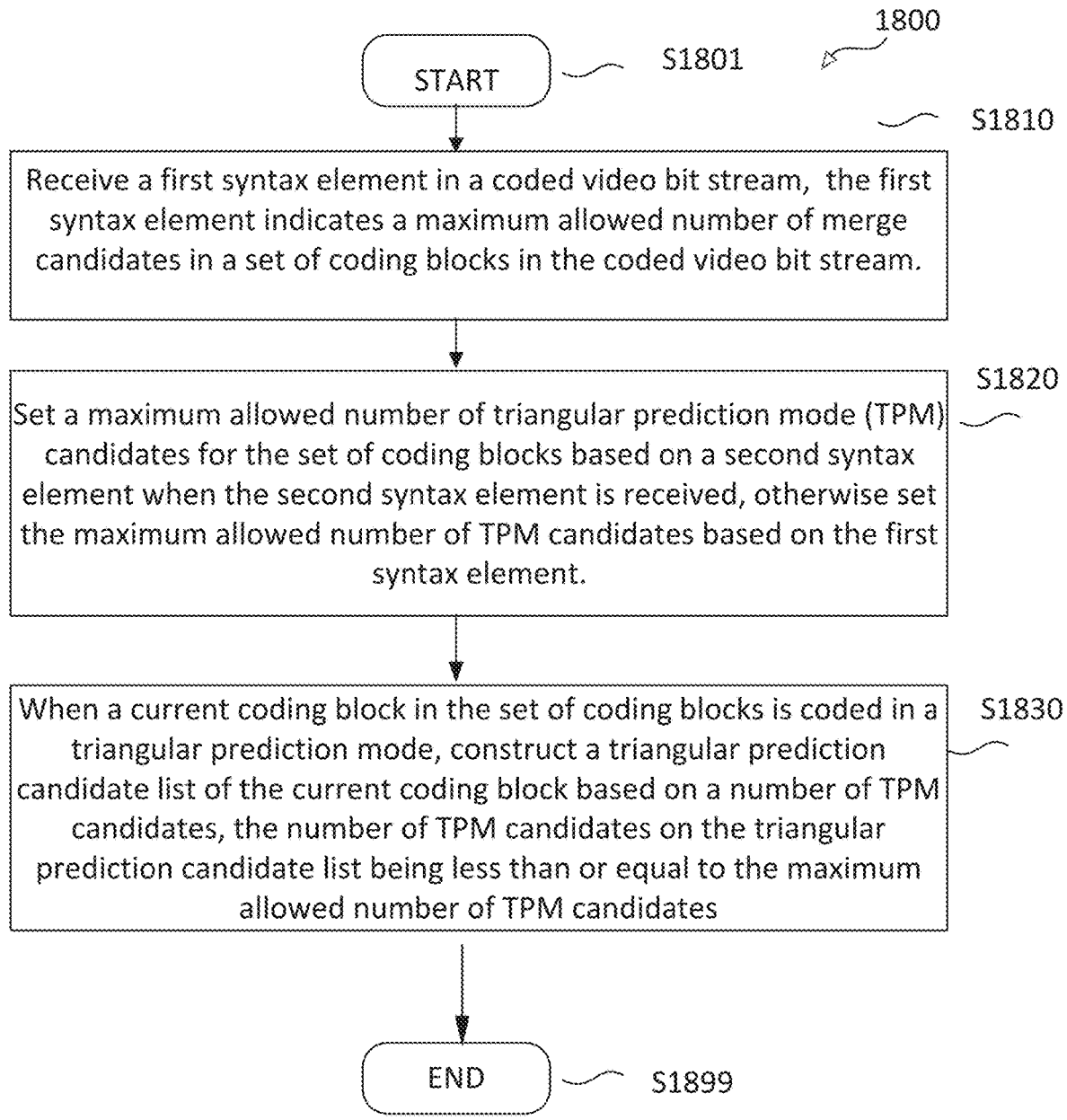
FIG. 18 shows a flow chart outlining a triangular prediction mode candidate list construction process according to an embodiment of the disclosure.

FIG. 18 shows a flow chart outlining a process (1800) according to an embodiment of the disclosure. The process (1800) can be used in the reconstruction of a block coded in intra mode, to generate a prediction block for the block under reconstruction. The process (1800) can be executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1800) is implemented in software instructions, thus when the processing circuitry executes the software instructions, the processing circuitry performs the process (1800). The process starts at (S1801) and proceeds to (S1810).

At (S1810), a first syntax element in a coded video bit stream is received. The first syntax element indicates a maximum allowed number of merge candidates in a set of coding blocks in the coded video bit stream. The syntax element can be signaled in an SPS, a PPS, a slice header, a tile header, a tile group header, or the like. Accordingly, the maximum allowed number of TPM candidates can be applied to a set of coding blocks controlled by the SPS, the PPS, the slice header, the tile header, or the tile group header, respectively.

At (S1820), a maximum allowed number of triangular prediction mode (TPM) candidates for the set of coding blocks is set based on a second syntax element when the second syntax element is received, otherwise the maximum allowed number of TPM candidates is set based on the first syntax element.

At (S1830), when a current coding block in the set of coding blocks is coded in a triangular prediction mode, a triangular prediction candidate list of the current coding block is constructed based on a number of TPM candidates, the number of TPM candidates on the triangular prediction candidate list being less than or equal to the maximum allowed number of TPM. The process (1800) proceeds to (S1899) and terminates at (S1899).

V. Computer System

The techniques described above, can be implemented as computer software using computer-readable instructions and physically stored in one or more computer-readable media. For example, FIG. 19 shows a computer system suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 19:
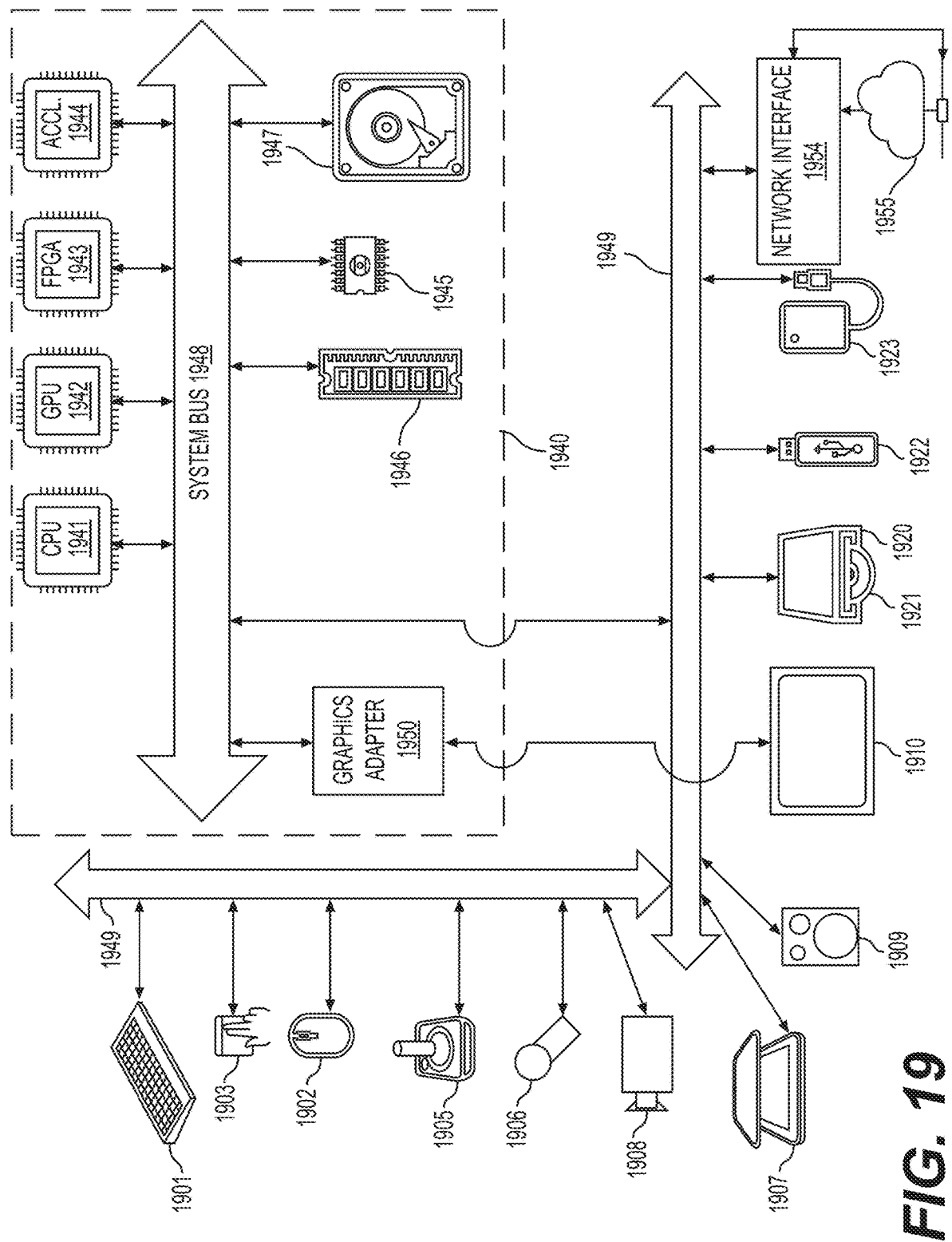
FIG. 19 is a schematic illustration of a computer system in accordance with an embodiment.

The components shown in FIG. 19 for the computer system are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of the computer system.

The computer system may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1901), mouse (1902), trackpad (1903), touch screen (1910), data-glove (not shown), joystick (1905), microphone (1906), scanner (1907), camera (1908).

The computer system may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1910), data-glove (not shown), or joystick (1905), but there can also be tactile feedback devices that do not serve as input devices), audio output devices (such as: speakers (1909), headphones (not depicted)), visual output devices (such as screens (1910) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

The computer system can also include human accessible storage devices and their associated media such as optical media including CD/DVD ROM/RW (1920) with CD/DVD or the like media (1921), thumb-drive (1922), removable hard drive or solid state drive (1923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

The computer system can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1949) (such as, for example USB ports of the computer system, others are commonly integrated into the core of the computer system by attachment to a system bus as described below (for example Ethernet interface into a PC computer system or cellular network interface into a smartphone computer system). Using any of these networks, computer system can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1940) of the computer system.

The core (1940) can include one or more Central Processing Units (CPU) (1941), Graphics Processing Units (GPU) (1942), specialized programmable processing units in the form of Field Programmable Gate Areas (FPGA) (1943), hardware accelerators for certain tasks (1944), and so forth. These devices, along with Read-only memory (ROM) (1945), Random-access memory (1946), internal mass storage such as internal non-user accessible hard drives, SSDs, and the like (1947), may be connected through a system bus (1948). In some computer systems, the system bus (1948) can be accessible in the form of one or more physical plugs to enable extensions by additional CPUs, GPU, and the like. The peripheral devices can be attached either directly to the core's system bus (1948), or through a peripheral bus (1949). Architectures for a peripheral bus include PCI, USB, and the like.

CPUs (1941), GPUs (1942), FPGAs (1943), and accelerators (1944) can execute certain instructions that, in combination, can make up the aforementioned computer code. That computer code can be stored in ROM (1945) or RAM (1946). Transitional data can be also be stored in RAM (1946), whereas permanent data can be stored for example, in the internal mass storage (1947). Fast storage and retrieve to any of the memory devices can be enabled through the use of cache memory, that can be closely associated with one or more CPU (1941), GPU (1942), mass storage (1947), ROM (1945), RAM (1946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture, and specifically the core (1940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1940) that are of non-transitory nature, such as core-internal mass storage (1947) or ROM (1945). The software implementing various embodiments of the present disclosure can be stored in such devices and executed by core (1940). A computer-readable medium can include one or more memory devices or chips, according to particular needs. The software can cause the core (1940) and specifically the processors therein (including CPU, GPU, FPGA, and the like) to execute particular processes or particular parts of particular processes described herein, including defining data structures stored in RAM (1946) and modifying such data structures according to the processes defined by the software. In addition or as an alternative, the computer system can provide functionality as a result of logic hardwired or otherwise embodied in a circuit (for example: accelerator (1944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
HMVP: History-based MVP
MVP: Motion vector predictor
TMVP: Temporal MVP
TPM: Triangular prediction mode
VTM: Versatile test model While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding in a decoder, comprising:
receiving a first syntax element in a coded video bit stream, the first syntax element indicating a maximum allowed number of merge candidates in a set of coding blocks in the coded video bit stream;
setting a maximum allowed number of triangular prediction mode (TPM) candidates for the set of coding blocks based on a second syntax element when the second syntax element is received, otherwise setting the maximum allowed number of TPM candidates based on the first syntax element; and
when a current coding block in the set of coding blocks is coded in a triangular prediction mode, constructing a triangular prediction candidate list of the current coding block based on a number of TPM candidates, the number of TPM candidates on the triangular prediction candidate list being less than or equal to the maximum allowed number of TPM candidates.

2. The method according to claim 1, further comprising:
receiving the second syntax element only when the first syntax element indicates that the maximum allowed number of merge candidates is greater than or equal to 2.

3. The method according to claim 1, wherein the maximum allowed number of TPM candidates is set to be 0 when the second syntax element is not received.

4. The method according to claim 1, further comprising:
receiving a third syntax element in the coded video bit stream, the third indicator indicating a difference between the maximum allowed number of merge candidates and the maximum allowed number of TPM candidates; and
determining the maximum allowed number of TPM candidates based on the first syntax element and the third syntax element.

5. The method according to claim 4, wherein
the maximum allowed number of TPM candidates is determined by subtracting the difference between the maximum allowed number of merge candidates and the maximum allowed number of TPM candidates from the maximum allowed number of merge candidates.

6. The method according to claim 1, wherein the maximum allowed number of TPM candidates is less than or equal to the maximum allowed number of merge candidates.

7. The method according to claim 1, wherein the maximum allowed number of TPM candidates is set to be the maximum allowed number of merge candidates when the second syntax element is not received.

8. The method according to claim 4, wherein the maximum allowed number of TPM candidates either equals to 0, or is an integer from 2 to the maximum allowed number of merge candidates.

9. The method according to claim 1, wherein the maximum allowed number of TPM candidates is determined to be 0 and the triangular prediction mode is not applied to the set of coding blocks when a third syntax element indicating a difference between the maximum allowed number of merge candidates and the maximum allowed number of TPM candidates is not received.

10. The method according to claim 1, wherein the current coding block is coded in the TPM only when the maximum allowed number of TPM candidates is greater than or equal to a predetermined number N, where N is a positive integer.

11. The method according to claim 1, further comprising:
when the maximum allowed number of TPM candidates is greater than 0, receiving a fourth syntax element that indicates a first index of the triangular prediction candidate list and a fifth syntax element that indicates a second index of the triangular prediction candidate list,
wherein
a maximum number of the first index equals to the maximum allowed number of TPM candidates minus one, and
a maximum number of the second index equals to the maximum allowed number of TPM candidates minus two.

12. An apparatus, comprising:
processing circuitry configured to:
receive a first syntax element in a coded video bit stream, the first syntax element indicating a maximum allowed number of merge candidates in a set of coding blocks in the coded video bit stream;
set a maximum allowed number of triangular prediction mode (TPM) candidates for the set of coding blocks based on a second syntax element when the second syntax element is received, otherwise set the maximum allowed number of TPM candidates based on the first syntax element; and when a current coding block in the set of coding blocks is coded in a triangular prediction mode, construct a triangular prediction candidate list of the current coding block based on a number of TPM candidates, the number of TPM candidates on the triangular prediction candidate list being less than or equal to the maximum allowed number of TPM candidates.

13. The apparatus according to claim 12, wherein the processing circuitry is further configured to receive the second syntax element only when the first syntax element indicates that the maximum allowed number of merge candidates is greater than or equal to 2.

14. The apparatus according to claim 12, wherein the maximum allowed number of TPM candidates is set to be 0 when the second syntax element is not received.

15. The apparatus according to claim 12, wherein the processing circuitry is further configured to receive a third syntax element in the coded video bit stream, the third indicator indicating a difference between the maximum allowed number of merge candidates and the maximum allowed number of TPM candidates; and determine the maximum allowed number of TPM candidates based on the first syntax element and the third syntax element.

16. The apparatus according to claim 15, wherein the maximum allowed number of TPM candidates is determined by subtracting the difference between the maximum allowed number of merge candidates and the maximum allowed number of TPM candidates from the maximum allowed number of merge candidates.

17. The apparatus according to claim 15, wherein the maximum allowed number of TPM candidates either equals to 0, or is an integer from 2 to the maximum allowed number of merge candidates.

18. The apparatus according to claim 12, wherein the maximum allowed number of TPM candidates is determined to be 0 and the triangular prediction mode is not applied to the set of coding blocks when a third syntax element indicating a difference between the maximum allowed number of merge candidates and the maximum allowed number of TPM candidates is not received.

19. The apparatus according to claim 12, wherein when the maximum allowed number of TPM candidates is greater than 0, the processing circuitry is further configured to receive a fourth syntax element that indicates a first index of the triangular prediction candidate list and a fifth syntax element that indicates a second index of the triangular prediction candidate list, a maximum number of the first index equals to the maximum allowed number of TPM candidates minus one, and a maximum number of the second index equals to the maximum allowed number of TPM candidates minus two.

20. A non-transitory computer-readable medium storing instructions which when executed by a computer for video decoding causes the computer to perform a method, the method comprising:

receiving a first syntax element in a coded video bit stream, the first syntax element indicating a maximum allowed number of merge candidates in a set of coding blocks in the coded video bit stream;

setting a maximum allowed number of triangular prediction mode (TPM) candidates for the set of coding blocks based on a second syntax element when the second syntax element is received, otherwise setting the maximum allowed number of TPM candidates based on the first syntax element; and when a current coding block in the set of coding blocks is coded in a triangular prediction mode, constructing a triangular prediction candidate list of the current coding block based on a number of TPM candidates, the number of TPM candidates on the triangular prediction candidate list being less than or equal to the maximum allowed number of TPM candidates.

* * * * *